(12) United States Patent
Taori et al.

(10) Patent No.: US 9,253,799 B2
(45) Date of Patent: Feb. 2, 2016

(54) METHOD AND APPARATUS FOR PERFORMING COMMUNICATION IN WIRELESS COMMUNICATION SYSTEM

(71) Applicant: Samsung Electronics Co., Ltd., Suwon-si, Gyeonggi-do (KR)

(72) Inventors: Rakesh Taori, Suwon-si (KR); Ha-Kyung Jung, Seoul (KR); Jung-Shin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 14/219,491

(22) Filed: Mar. 19, 2014

(65) Prior Publication Data
US 2014/0287769 A1    Sep. 25, 2014

(30) Foreign Application Priority Data

Mar. 19, 2013 (KR) ................. 10-2013-0028950

(51) Int. Cl.
| | |
|---|---|
| H04W 74/08 | (2009.01) |
| H04W 16/14 | (2009.01) |
| H04W 88/06 | (2009.01) |
| H04W 72/04 | (2009.01) |

(52) U.S. Cl.
CPC .......... *H04W 74/0808* (2013.01); *H04W 16/14* (2013.01); *H04W 72/04* (2013.01); *H04W 72/0453* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 8,126,473 | B1 * | 2/2012 | Kim | ................. H04L 12/40045 455/422.1 |
| 2002/0197998 | A1 | 12/2002 | Schmidt | |
| 2009/0109921 | A1 * | 4/2009 | Bowen | ................. H04W 36/24 370/331 |
| 2009/0190566 | A1 | 7/2009 | Kwon et al. | |
| 2011/0044218 | A1 | 2/2011 | Kaur et al. | |
| 2011/0275359 | A1 | 11/2011 | Sebire et al. | |
| 2012/0077510 | A1 | 3/2012 | Chen et al. | |
| 2012/0113839 | A1 | 5/2012 | Etemad | |
| 2012/0129522 | A1 | 5/2012 | Kim et al. | |
| 2012/0140743 | A1 | 6/2012 | Pelletier et al. | |
| 2012/0300712 | A1 * | 11/2012 | Hakola | ............... H04W 74/008 370/329 |
| 2012/0307748 | A1 | 12/2012 | Cheng et al. | |
| 2013/0203429 | A1 * | 8/2013 | Kneckt | ............. H04W 74/0816 455/450 |

FOREIGN PATENT DOCUMENTS

WO    2012/139278 A1    10/2012

* cited by examiner

*Primary Examiner* — Charles Appiah
*Assistant Examiner* — Margaret G Mastrodonato
(74) *Attorney, Agent, or Firm* — Jefferson IP Law, LLP

(57) ABSTRACT

A method for performing communication by a cellular base station in a wireless communication system is provided. The method includes performing channel contention for occupying a channel of an unlicensed band, if the channel of the unlicensed band is occupied, the cellular base station transmits a first message including information about a time period in which the channel of the unlicensed band is usable, to at least one first User Equipment (UE) that performs communication in the channel of the unlicensed band using a first communication scheme, and communicating with a second UE using a second communication scheme different from the first communication scheme in the channel of the unlicensed band during a time period corresponding to the time period information. The second communication scheme corresponds to a cellular communication scheme, and the first message is transmitted to the at least one first UE based on the first communication scheme.

20 Claims, 19 Drawing Sheets

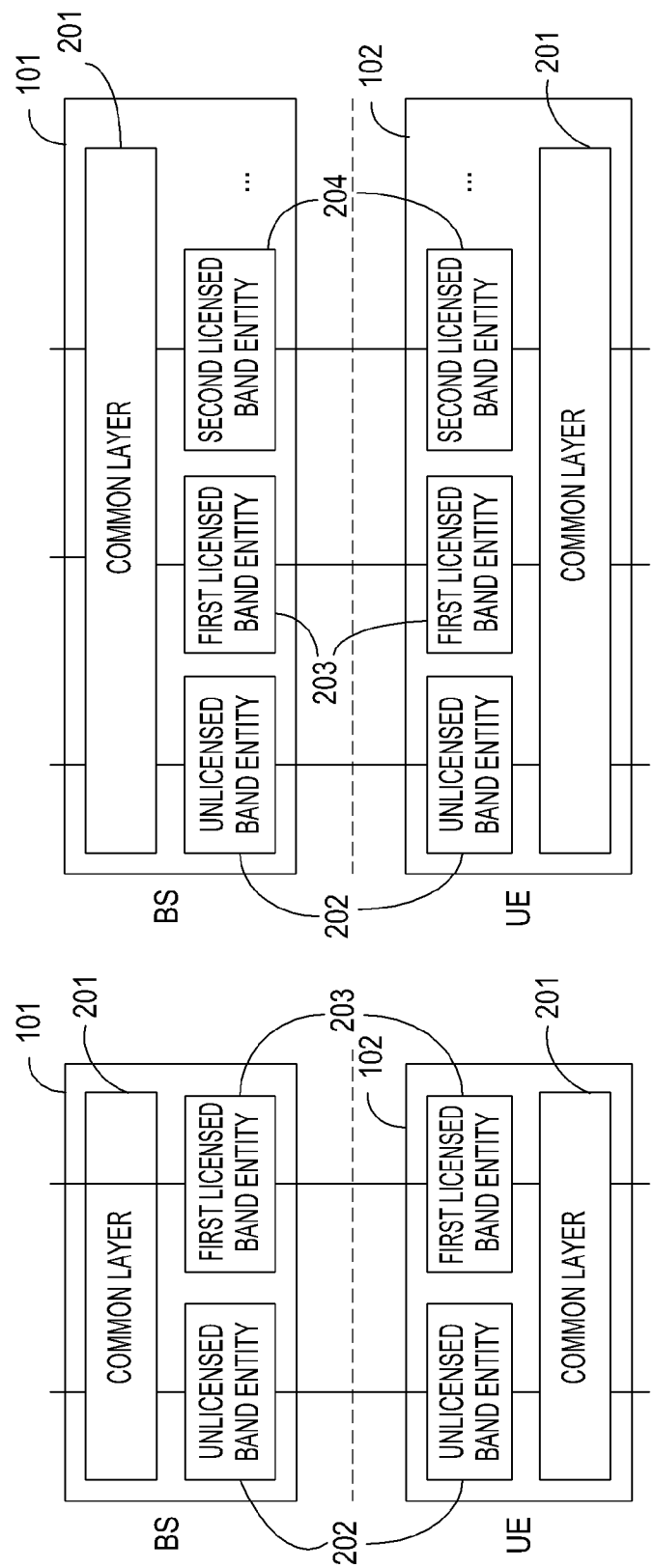

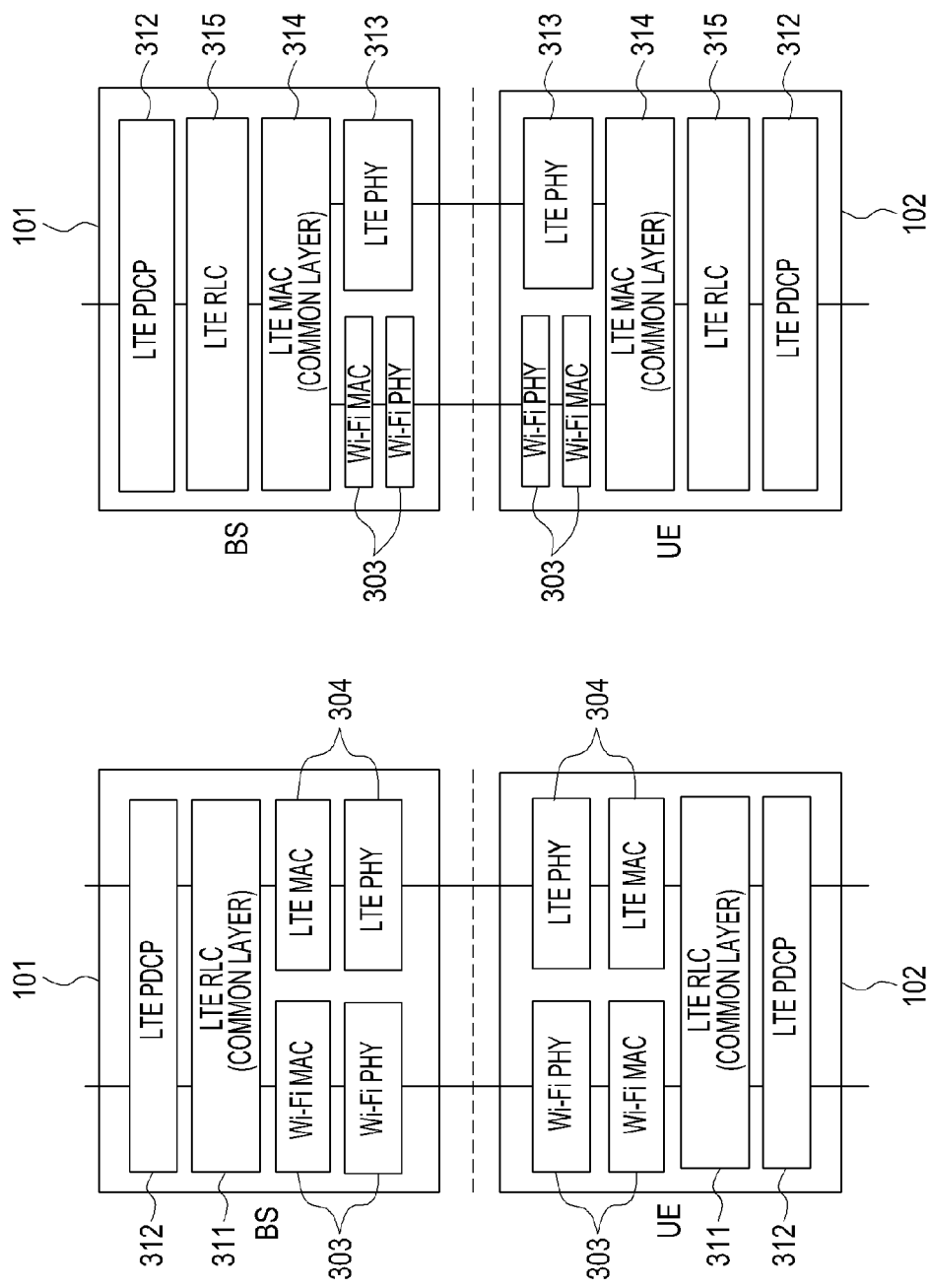

METHOD AND APPARATUS FOR PERFORMING COMMUNICATION IN WIRELESS COMMUNICATION SYSTEM

CROSS-REFERENCE TO RELATED APPLICATION(S)

This application claims the benefit under 35 U.S.C. §119 (a) of a Korean patent application filed on Mar. 19, 2013 in the Korean Intellectual Property Office and assigned Serial number 10-2013-0028950, the entire disclosure of which is hereby incorporated by reference.

TECHNICAL FIELD

The present disclosure relates to a method and apparatus for performing communication in a wireless communication system.

BACKGROUND

Most of the recent terminals (also known as User Equipments (UEs)) are multi-mode terminals that may use different wireless communication technologies such as Wireless Local Area Network (WLAN), cellular communication, Bluetooth, and the like. Typically, the multi-mode terminal may access one wireless communication network to receive services, and when desiring to access another wireless communication network, the multi-mode terminal may perform handover from the existing wireless communication network to a new wireless communication network. Therefore, there is a need for the network structure and various technologies for the continuity of services when a terminal moves from one wireless communication network to another wireless communication network. In 3rd Generation Partnership Project (3GPP), the network structure and various technologies needed for the terminal's movement between a 3GPP wireless communication network and a WLAN network are especially called interworking WLAN. The multi-mode wireless communication technology has evolved not only to use one communication technology at a time, but also to use multiple wireless communication technologies at the same time. The use of multiple wireless communication technologies simultaneously thereby increases transfer rates per unit time or improves the reliability of the terminal.

In wireless communication, the spectral band is very rare resources. A licensed band represents a frequency band that is exclusively licensed to a specific operator to provide specific wireless services. On the other hand, an unlicensed band (or license-exempt band) represents a frequency band that is not allocated to a specific operator, but is opened so that all entities meeting the predefined requirements may use the frequency band. The licensed band may be fundamentally prevented from undergoing interference caused by wireless services of other operators, since only the licensed or authorized operator may provide wireless services in the licensed band. However, interference control is a very important factor for the unlicensed band since the unlicensed band is a frequency band that any operators or individuals may use in an open way.

WLAN that uses Wireless Fidelity (Wi-Fi) which is the typical wireless communication technology used in the unlicensed band may operate based on Carrier Sense Multiple Access with Collision Avoidance (CSMA/CA). Specifically, in the WLAN, when a terminal needs to start transmission, a Clear Channel Assessment (CCA) interface of a physical layer may first perform a carrier sense operation of determining whether a wireless channel is in an idle state. The WLAN may start the transmission, if it is determined that the wireless channel is in the idle state for a specific time (e.g., Distributed Inter Frame Space (DIFS)). However, if the wireless channel is not in the idle state for the specific time, the WLAN needs to wait until the ongoing transmission in the wireless channel is completed.

In addition to the carrier sense operation that is performed in the CCA interface of the physical layer, a Virtual Carrier Sensing (VCS) operation may be performed in a Media Access Control (MAC) layer. A Duration field of a MAC header of a Wi-Fi frame may include information about required transmission time for the frame and a series of the Wi-Fi frame's succeeding frames. Therefore, upon receiving the frame, a terminal may determine that the wireless channel is busy or in use, regardless of the results of the carrier sense operation that has been performed in the CCA interface for the time corresponding to the time information included in the Duration field. In this way, the Wi-Fi frame and a series of the Wi-Fi frame's succeeding frames may be securely transmitted.

As described above, an unlicensed band is a frequency band that is not allocated to a specific operator, but is opened so that all entities meeting the predefined requirements may use the frequency band. Therefore, communication technology that uses the unlicensed band is required to design a protocol that considers interference from other services. If the communication technologies (e.g., cellular communication and the like), which were originally designed without assuming that the communication technologies may be used in the unlicensed band, are used in the unlicensed band, their transmission may affect transmission of the existing WLAN system.

Accordingly, a method and apparatus for performing data communication using an unlicensed band without the impact of interference from other services in a common wireless communication system is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing data communication using an unlicensed band without the impact of interference from other services in a common wireless communication system.

Another aspect of the present disclosure is to provide a method and apparatus for safely using, in an unlicensed band, specific communication technology that does not consider the characteristics of the unlicensed band, such as cellular communication.

Another aspect of the present disclosure is to provide a method and apparatus for safely using unlicensed band communication technology in a licensed band, thereby reducing the frequency usage costs and increasing the data throughput of specific communication technology.

In accordance with an aspect of the present disclosure, a method for performing communication by a cellular base station in a wireless communication system is provided. The method includes performing channel contention for occupying a channel of an unlicensed band, if the channel of the unlicensed band is occupied, transmitting a first message including information about a time period in which the channel of the unlicensed band is usable, to at least one first User Equipment (UE) that performs communication in the channel of the unlicensed band using a first communication scheme, and performing communication with a second UE using a second communication scheme different from the first communication scheme in the channel of the unlicensed band during a time period corresponding to the time period information. The second communication scheme corresponds to a cellular communication scheme, and the first message is transmitted to the at least one first UE based on the first communication scheme.

In accordance with another aspect of the present disclosure, a method for performing communication by a UE in a wireless communication system is provided. The method includes transmitting a first message including information indicating whether a channel of an unlicensed band is usable by the UE, to a cellular base station in a channel of a cellular band using a first communication scheme, if the channel of the unlicensed band is usable by the UE, receiving an allocated channel of the unlicensed band from the cellular base station, and performing communication with the cellular base station in the allocated channel of the unlicensed band using the first communication scheme. The first communication scheme includes a cellular communication scheme, and is different from a second communication scheme that is used in the channel of the unlicensed band.

In accordance with further another aspect of the present disclosure, a cellular base station in a wireless communication system is provided. The cellular base station includes a first communication entity configured to perform communication using a first communication scheme, a second communication entity configured to perform communication using a second communication scheme, and a controller configured to control the first communication entity to perform channel contention for occupying a channel of an unlicensed band, and if the channel of the unlicensed band is occupied, transmit a first message including information about a time period in which the channel of the unlicensed band is usable, to at least one first UE that performs communication in the channel of the unlicensed band using the first communication scheme, and to control the second communication entity to perform communication with a second UE using a second communication scheme different from the first communication scheme in the channel of the unlicensed band during a time period corresponding to the time period information. The second communication scheme corresponds to a cellular communication scheme, and the first message is transmitted to the at least one first UE based on the first communication scheme.

In accordance with yet another aspect of the present disclosure, a UE in a wireless communication system is provided. The UE includes a first entity configured to send a first message including information indicating whether a channel of an unlicensed band is usable by the UE, to a cellular base station in a channel of a cellular band using a first communication scheme, and a controller configured to, if the channel of the unlicensed band is usable by the UE, receive an allocated channel of the unlicensed band from the cellular base station, and perform communication with the cellular base station in the allocated channel of the unlicensed band using the first communication scheme. The first communication scheme includes a cellular communication scheme, and is different from a second communication scheme that is used in the channel of the unlicensed band.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B illustrate internal hierarchical configurations of a Base Station (BS) and a User Equipment (UE) according to an embodiment of the present disclosure;

FIGS. 3A, 3B, 3C, and 3D illustrate locations of common layers in a BS and a UE that use Wireless Fidelity (Wi-Fi) communication and Long Term Evolution (LTE) communication according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic is intended to provide.

Figure 1:
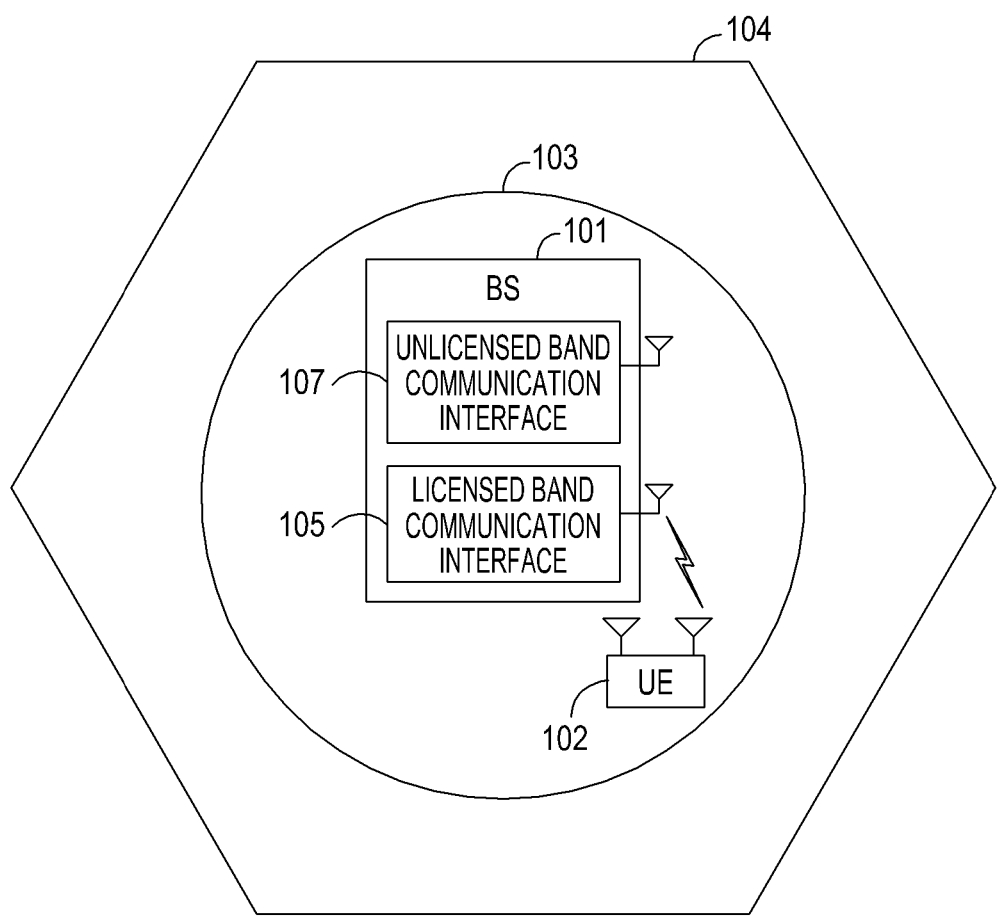
FIG. 1 illustrates a configuration of a wireless communication system according to an embodiment of the present disclosure.

FIG. 1 illustrates a configuration of a wireless communication system according to an embodiment of the present disclosure.

Referring to FIG. 1, the wireless communication system may include a Base Station (BS) 101 and a User Equipment (UE) 102.

Each of the BS 101 and the UE 102 performing communication with the BS 101 may include a plurality of wireless interfaces. The plurality of wireless interfaces may include an unlicensed band communication interface 107 for performing communication using an unlicensed band, and a licensed band communication interface 109 for performing communication using a licensed band. Typically, the unlicensed band communication interface 107, compared with the licensed band communication interface 109, may transmit a signal with lower transmit power in accordance with the provisions of the unlicensed band. Therefore, a transmission range 103 of an unlicensed band signal may be smaller than a transmission range 104 of a licensed band signal.

Although it is assumed in FIG. 1 that for convenience of description, the transmission range 103 of the unlicensed band signal is included in the transmission range 104 of the licensed band signal, the transmission range 103 of the unlicensed band signal may partially overlap the transmission range 104 of the licensed band signal. In some cases, the transmission range 104 of the licensed band signal may be included in the transmission range 103 of the unlicensed band signal.

The method presented in an embodiment of the present disclosure may be applied to a case where the UE 102 is located in an overlapping region where the transmission range 103 of the unlicensed band signal overlaps the transmission range 104 of the licensed band signal.

FIGS. 2A and 2B illustrate internal hierarchical configurations of a BS and a UE according to an embodiment of the present disclosure.

Referring to FIGS. 2A and 2B, each of the BS 101 and the UE 102 may include an unlicensed band entity 202, one or more licensed band entities 203 and 204 that use another communication technology, and a common layer 201 that collectively manages the unlicensed band entity 202 and the licensed band entities 203 and 204. The common layer 201 may be implemented as a separate independent layer, or implemented as an extended function of the existing protocol layer, as the common layer 201 is defined as a logical function.

For a packet that is provided from an upper layer of the BS 101 to the common layer 201, a channel of an unlicensed band may be reserved by the unlicensed band entity 202, and then, the communication technology, with which the packet is to be transmitted to the UE 102, may be determined by the common layer 201. The unlicensed band entity 202 may perform a function of transmitting and receiving packets to/from the common layer 201, and a function of reserving a channel to protect the transmission/reception of packets that are forwarded from the common layer 201 to the licensed band entities 203 and 204.

Each of the BS 101 and the UE 102 may include one unlicensed band entity 202 and one licensed band entity 203, as illustrated in FIG. 2A. Alternatively, as illustrated in FIG. 2B, each of the BS 101 and the UE 102 may include one unlicensed band entity 202 and two or more different licensed band entities 203 and 204.

The unlicensed band as described in an embodiment of the present disclosure may represent a frequency band where Wi-Fi communication is performed. Whereas, the licensed band may represent a frequency band where cellular communication, such as Long Term Evolution (LTE) communication, is performed. In a case where the unlicensed band represents the frequency band where Wi-Fi communication is performed and the licensed band represents the frequency band where LTE communication is performed, the common layer may be located as illustrated in FIGS. 3A to 3D.

FIGS. 3A to 3D illustrate locations of common layers in a BS and a UE that use Wi-Fi communication and LTE communication according to an embodiment of the present disclosure.

The common layer that collectively manages entities for Wi-Fi communication and entities for LTE communication may be implemented in various ways as illustrated in FIGS. 3A to 3D.

Figures 3A, 3B:
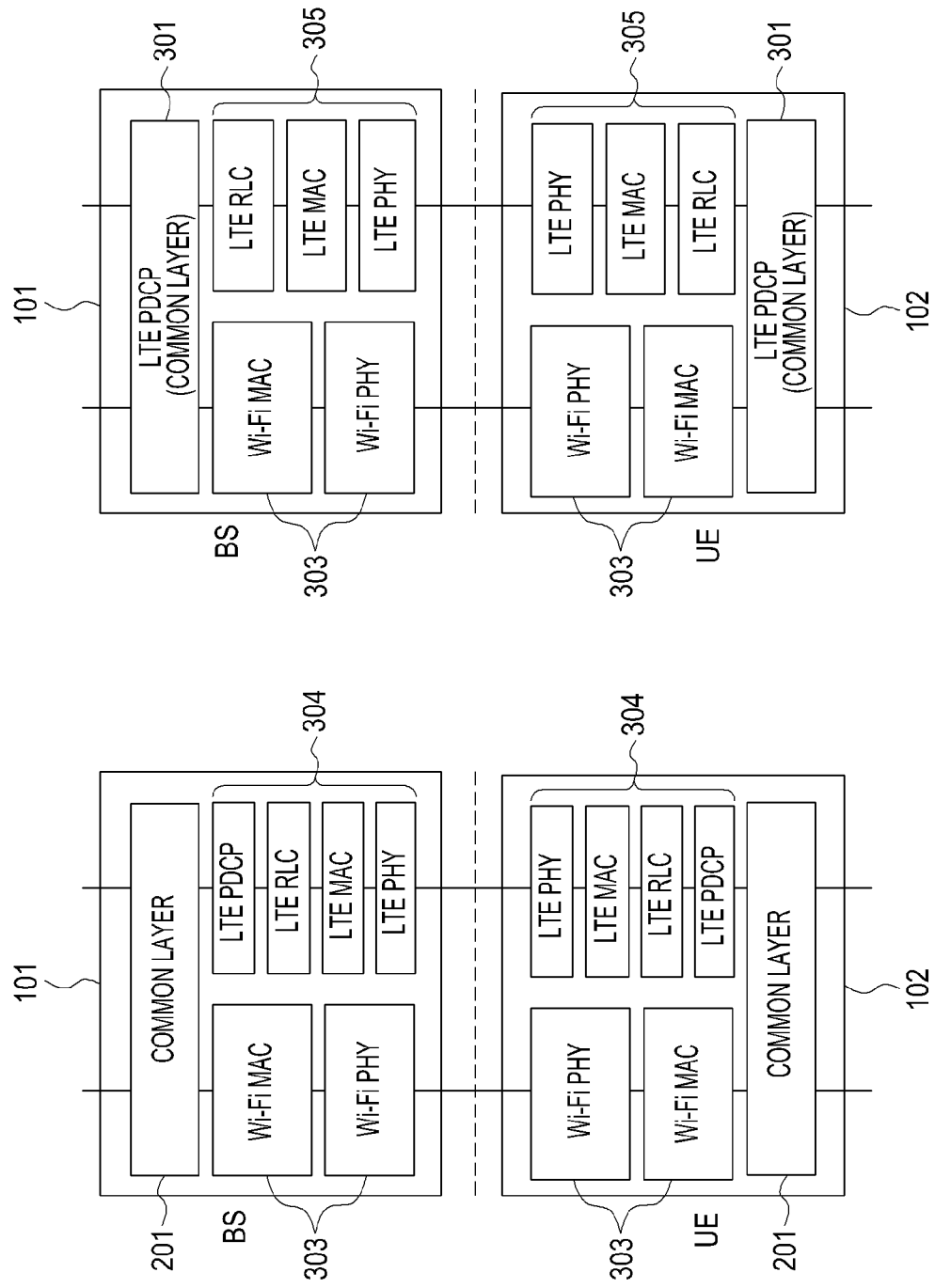

Referring to FIG. 3A, an example where a common layer 201 collectively manages a WLAN protocol stack 303 and an LTE protocol stack 304 is defined over the WLAN protocol stack 303 (e.g., a Media Access Control (MAC) layer and a Physical (PHY) layer) defined in the existing Wi-Fi standard, and the LTE protocol stack 304 (e.g., a Packet Data Convergence Protocol (PDCP) layer, a Radio Link Control (RLC) layer, a MAC layer, and a PHY layer) defined in 3GPP is illustrated.

For a packet that is provided from an upper layer to the common layer of a BS, a channel of an unlicensed band may be reserved by the WLAN protocol stack, and then, the packet may be transmitted to a UE through the WLAN protocol stack or the LTE protocol stack depending on the decision of the common layer.

Referring to FIG. 3B, an example where a function of a common layer 301 is added to an LTE PDCP layer. For a packet that has arrived at an LTE PDCP layer of a BS 101, a channel of an unlicensed band may be reserved by the WLAN protocol stack 303, and then, the packet may be transmitted to a UE 102 through the WLAN protocol stack or a lower LTE protocol stack 305 (e.g., RLC, MAC, and PHY layers) depending on the decision of the common layer 301 (or the PDCP layer) is illustrated.

Referring to FIG. 3C, an example where a function of a common layer is added to an LTE RLC layer 311. For a packet that is forwarded from an LTE PDCP layer 312 of a BS 101 to an LTE RLC layer 311 (or the common layer), a channel of an unlicensed band may be reserved by the WLAN protocol stack 303, and then, the packet may be transmitted to a UE 102 through the WLAN protocol stack 303 or a lower LTE protocol stack 304 (e.g., MAC and PHY layers) depending on the decision of the common layer (or the RLC layer) 311 is illustrated.

Referring to FIG. 3D, an example where a function of a common layer is added to an LTE MAC layer 314. For a packet that has come to an LTE MAC layer 314 (or the common layer) through an LTE PDCP 312 and RLC layers 315 of a BS 101, a channel of an unlicensed band may be reserved by the WLAN protocol stack 303, and then, the packet may be transmitted to a UE 102 through the WLAN protocol stack 303 or a lower LTE PHY layer 313 depending on the decision of the common layer (or the MAC layer) is illustrated.

Although it is assumed in FIGS. 3A to 3D that the Wi-Fi communication technology and the LTE communication technology are collectively managed by the common layers in the BS 101 and the UE 102, the same may be applied to other communication technologies such as High Speed Packet Access (HSPA) and the like, in the similar way. In addition, although it is assumed in FIGS. 3A to 3D that one LTE PHY layer is included in each of the BS 101 and the UE 102, a plurality of LTE PHY layers may be included in each of the BS 101 and the UE 102, like in FIG. 2B in which a plurality of licensed band entities 203 and 204 are included in each of the BS 101 and the UE 102. In other words, if there are two or more different licensed bands, a plurality of licensed band entities corresponding to their associated licensed bands may be included in each of the BS and the UE.

Figure 4:
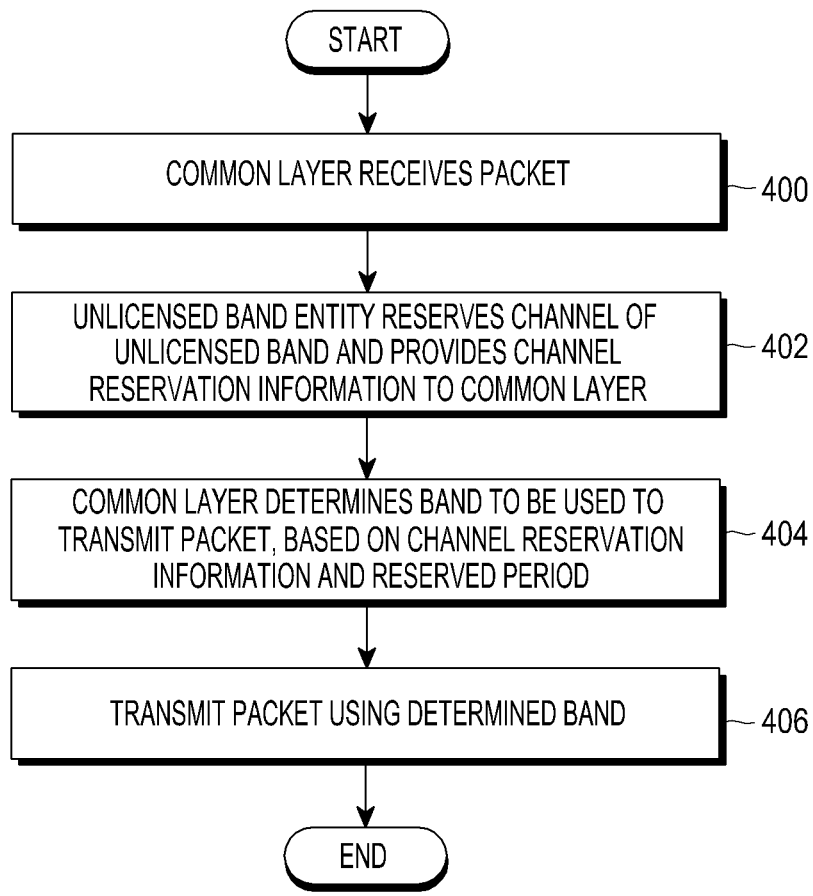
FIG. 4 is a flowchart illustrating a method for transmitting data by a BS according to an embodiment of the present disclosure.

FIG. 4 is a flowchart illustrating a method for transmitting data by a BS according to an embodiment of the present disclosure.

Referring to FIG. 4, a common layer of the BS may receive a packet from an upper layer in operation 400. In operation 402, an unlicensed band entity may reserve a channel of an unlicensed band, and provide channel reservation information to the common layer. When reserving the channel of the unlicensed band, the unlicensed band entity may use a channel reservation method proposed in an embodiment of the present disclosure.

The channel reservation method may be roughly divided into three types. Among the three channel reservation methods, a first channel reservation method is a method of reserving a channel of an unlicensed band using Request To Send (RTS) and Clear To Send (CTS) control frames. A Duration field of a MAC header included in each of the RTS and CTS control frames may include information about required transmission time for the frame and a series of RTS and CTS control frames' succeeding frames.

Upon receiving the RTS and CTS control frames, a UE that uses an unlicensed band may determine that the channel is busy and/or in use, regardless of the results of the carrier sense operation that is performed by a Clear Channel Assessment (CCA) interface of an unlicensed band (Wi-Fi) PHY layer, for a time specified in the Duration field. Therefore, for secure channel reservation, the BS and the UE may cause another UE that may use a channel of an unlicensed band, not to use a channel of the unlicensed band for a time corresponding to required transmission time information included in the Duration field of the RTS and CTS control frames.

A second channel reservation method is a method in which a BS sets a destination address of a CTS control frame as an address of the BS and broadcasts the address using a CTS-to-self frame. The CTS-to-self frame is a special type of the CTS control frame. For secure channel reservation, the second method, like the first method, may cause another UE that may use a channel of an unlicensed band, not to use a channel of the unlicensed band for a time corresponding to time information included in a Duration field of the CTS-to-self frame.

A third channel reservation method is a method in which a BS broadcasts only the preamble and Physical Layer Convergence Protocol (PLCP) header parts of a PHY layer except for a payload of an unlicensed band frame. Upon receiving the PLCP header, based on a Rate field (indicating a transfer rate of the BS) and a Length field (indicating a time required to transmit one MAC Packet Data Unit (PDU)) included in the PLCP header, a UE may estimate the duration during which a frame is received, regardless of whether the UE has the capability supporting the rate. During the duration, the UE may determine that the channel is busy, regardless of the carrier sense results by the CCA interface of the unlicensed band PHY layer. Therefore, the BS may broadcast the PLCP header including information about the transmission duration, to cause another UE that may use a channel of an unlicensed band, not to use a channel of the unlicensed band, thereby guaranteeing secure channel reservation.

If a channel of the unlicensed band is reserved according to the above method, the unlicensed band entity (and/or unlicensed band interface) may provide channel reservation information (e.g., channel number and/or frequency, bandwidth information, reserved period and the like of the unlicensed band) to the common layer. In operation 404, the common layer may determine a radio access to be used to transmit a packet, based on whether the channel is reserved and on the reserved period. The common layer may determine the communication technology with which the common layer will transmit the packet received at the common layer through the unlicensed band, taking into account various conditions such as the state or traffic load of each radio access. In operation 406, the common layer may transmit the packet through an interface corresponding to the determined radio access.

If a plurality of licensed band communication entities exists under the common layer as illustrated in FIG. 2B, a first licensed band entity among the plurality of licensed band communication entities may be exclusively used for a licensed band and a second licensed band entity among the plurality of licensed band communication entities may be exclusively used for an unlicensed band. In this case, upon receiving notification information indicating that a channel of an unlicensed band is reserved by an unlicensed band entity, the common layer may transmit a packet using one of the first licensed band entity and the second licensed band entity.

Next, a description will be made of a process of performing data communication, which is performed in a licensed band, using a channel of an unlicensed band by a BS and a UE according to an embodiment of the present disclosure. This process may be performed as illustrated in FIGS. 5A to 5C, according to the three channel reservation methods.

First, reference will be made to FIG. 5A to describe a method of performing data communication, which is performed in a licensed band, by reserving a channel of an unlicensed band using RTS and CTS control frames.

Figure 5A:
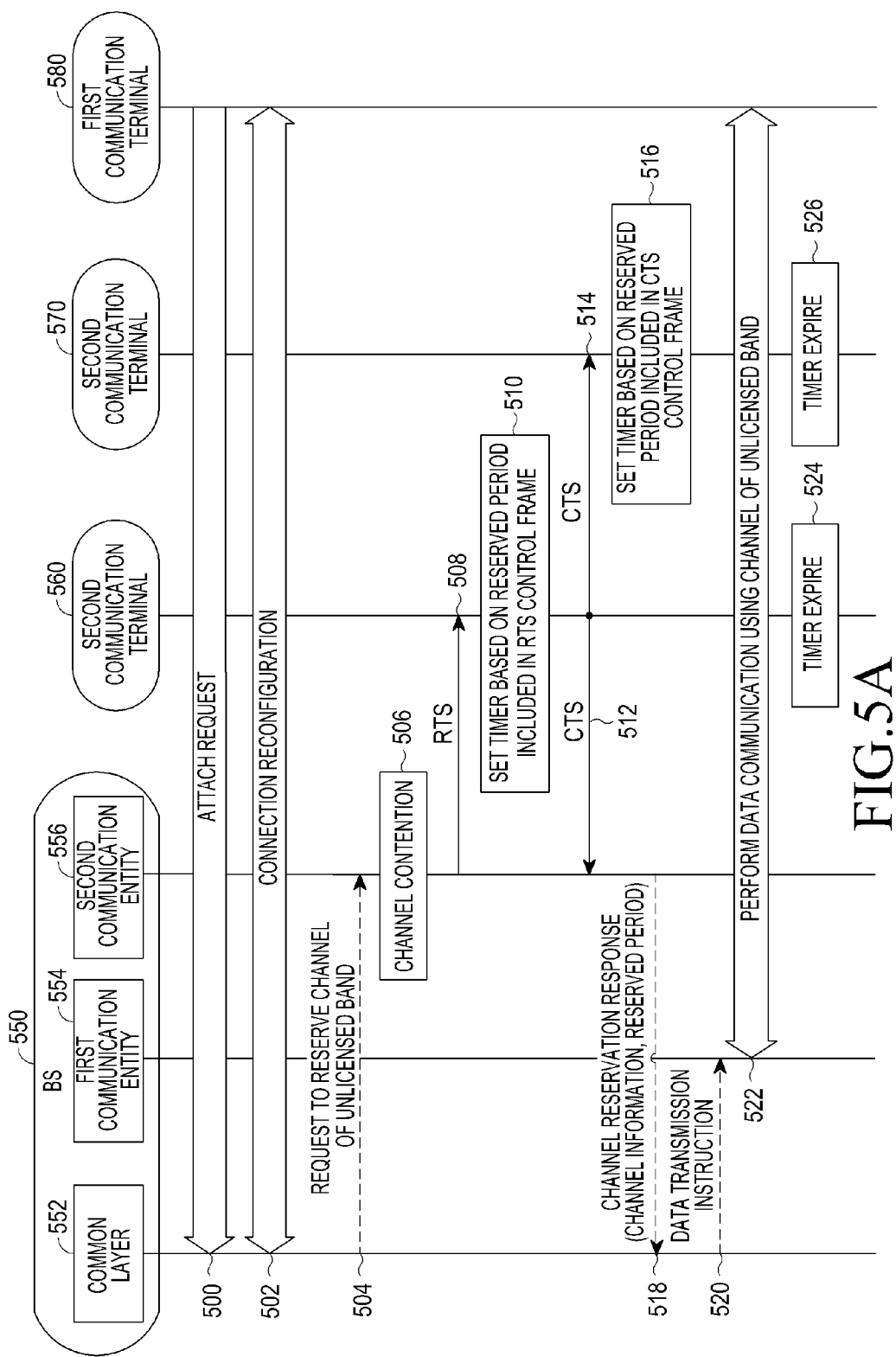
FIG. 5A is a signaling diagram illustrating a process of performing data communication, which is performed in a licensed band, by reserving a channel of an unlicensed band using Request To Send (RTS) and Clear To Send (CTS) control frames according to an embodiment of the present disclosure.
Figure 5B:
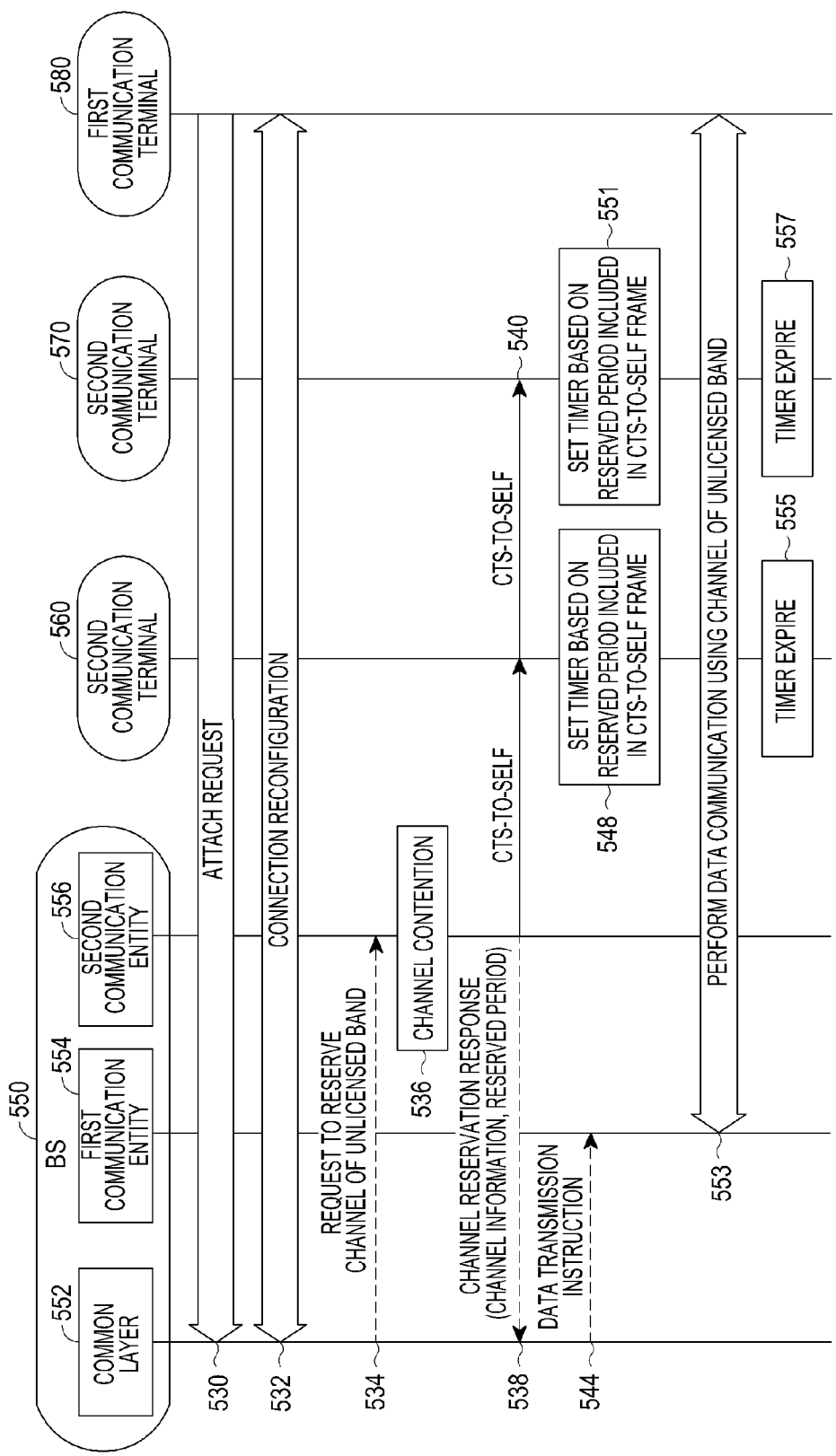
FIG. 5B is a signaling diagram illustrating a process of performing data communication, which is performed in a licensed band, by reserving a channel of an unlicensed band using a CTS-to-self frame according to an embodiment of the present disclosure.
Figure 5C:
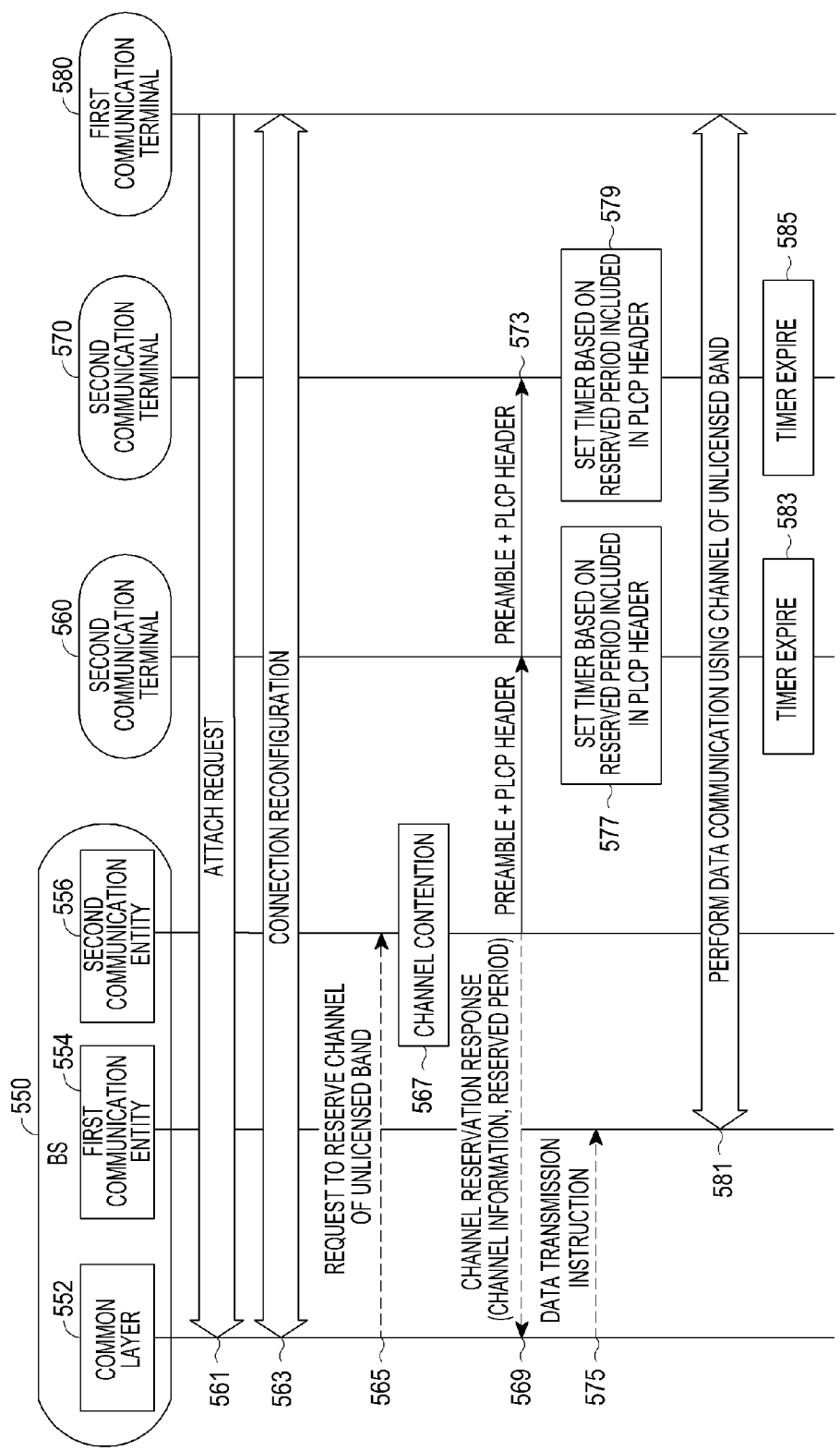
FIG. 5C is a signaling diagram illustrating a process of performing data communication, which is performed in a licensed band, by reserving a channel of an unlicensed band using a preamble and a Physical Layer Convergence Protocol (PLCP) header of a Physical (PHY) layer except for a payload of an unlicensed band frame according to an embodiment of the present disclosure.

FIG. 5A is a signaling diagram illustrating a process of performing data communication, which is performed in a licensed band, by reserving a channel of an unlicensed band using RTS and CTS control frames according to an embodiment of the present disclosure.

Referring to FIG. 5A, a BS 550 may include a common layer 552, a first communication entity 554 that performs communication corresponding to a first communication scheme (e.g., an LTE communication scheme) in a licensed band or an unlicensed band, and a second communication entity 556 that performs communication corresponding to a second communication scheme (e.g., a Wi-Fi communication scheme) in an unlicensed band. A first communication terminal 580 performing communication with the BS 550 may include a communication entity for performing communication corresponding to the first communication scheme, and second communication terminals 560 and 570 performing communication corresponding to the second communication scheme may exist around the BS 550 and the first communication terminal 580.

In this communication environment, in operation 500, the first communication terminal 580 may send to the BS 550 an Attach Request message including information (including information indicating whether an unlicensed band is available) about a radio band supported by the first communication terminal 580, for the first communication terminal 580's initial access to the BS 550.

In operation 502, the BS 550 may reconfigure a connection to the first communication terminal 580 by sending a Connection Reconfiguration message to the first communication terminal 580 so that the first communication terminal 580 may perform communication based on a specific wireless interface. Using the Connection Reconfiguration message, the BS 550 may command the first communication terminal 580 to prepare to perform communication corresponding to the first communication scheme in an unlicensed band, and transmit, to the first communication terminal 580, center frequency information and bandwidth information of an unlicensed band, which will be used for the unlicensed band communication. In the case of LTE communication, the Connection Reconfiguration message may be implemented by extending a Radio Resource Control (RRC) Connection Reconfiguration message.

Upon receiving a packet, the common layer 552 of the BS 550 may request the second communication entity 556 to reserve a channel of an unlicensed band in operation 504. The common layer 552 may also provide, to the second communication entity 556, a channel number of an unlicensed band, which is desired to be reserved, and a reserved period indicating a period for which the channel of the unlicensed band is to be used.

In operation 506, the second communication entity 556 may perform channel contention for an unlicensed band. For example, if the unlicensed band is a Wi-Fi band, the second communication entity 556 may perform Carrier Sense Multiple Access with Collision Avoidance (CSMA/CA) channel contention that is based on the IEEE 802.11 standard.

If a channel of an unlicensed band is successfully occupied through the channel contention, the second communication entity 556 may transmit an RTS control frame to the nearby second communication terminal 560 in operation 508. A Duration field of a MAC header of the RTS control frame may include information about a reserved period requested by the common layer 552.

Although it is assumed in an embodiment of the present disclosure that the second communication entity 556 transmits the RTS control frame to the second communication terminal 560 on the assumption that the first communication terminal 580 does not have an entity for performing communication corresponding to the second communication scheme, the second communication entity 556 may transmit the RTS control frame to the first communication terminal 580 if the first communication terminal 580 has the entity for performing communication corresponding to the second communication scheme.

Upon receiving the RTS control frame, the second communication terminal 560 may set a timer according to the reserved period information included in the Duration field of the MAC header of the RTS control frame in operation 510. The timer may be a Network Allocation Vector (NAV) timer, and while the NAV timer is driven, the second communication terminal 560 may not participate in the channel contention, determining that a channel of an unlicensed band is busy.

In operation 512, the second communication terminal 560 may transmit a CTS control frame to the BS 550 in response to the RTS control frame. As shown in operation 514, the second communication terminal 560 may transmit the CTS control frame even to another nearby second communication terminal 570. The CTS control frame, like the RTS control frame, may include information about the reserved period. Accordingly, in operation 516, the second communication terminal 570 may set a timer according to the reserved period information included in the Duration field of the MAC header of the CTS control frame. The second communication terminal 570 may drive the timer as the NAV timer, and may not participate in the channel contention for an unlicensed band during the period in which the timer is driven.

If the CTS control frame is received, the second communication entity 556 of the BS 550 may determine that a channel of an unlicensed band has been successfully reserved. In operation 518, the second communication entity 556 may send a channel reservation response message to the common layer 552. The channel reservation response message may include channel information (channel number or frequency and bandwidth information of an unlicensed band) and information about the reserved period.

The common layer 552 may determine the communication scheme to be used for common layer 552's communication with a UE in a channel of an unlicensed band, taking into account the wireless environment condition, traffic load and the like. If the common layer 552 determines to use the first communication scheme in a channel of an unlicensed band, the common layer 552 may instruct the first communication entity 554 to transmit data in accordance with the first communication scheme in the channel of the unlicensed band, in operation 520.

In operation 522, the first communication entity 554 may perform data communication in accordance with the first communication scheme which is used in the licensed band, using the channel of the unlicensed band, until the reserved period of the unlicensed band expires. For example, if the LTE communication scheme is used in the licensed band, the first communication entity 554 may perform data transmission/reception in accordance with the LTE communication scheme using the resources for Wi-Fi communication which is communication of an unlicensed band. The data transmission/reception method that is based on the LTE communication scheme may follow the standard of the LTE communication, a detailed description thereof will be omitted in an embodiment of the present disclosure.

If the timers expire in operations 524 and 526, the second communication terminals 560 and 570 may perform again the channel contention for a channel of an unlicensed band to perform data communication based on the second communication scheme.

Next, reference will be made to FIG. 5B to describe a method of performing data communication, which is performed in a licensed band, by reserving a channel of an unlicensed band using a CTS-to-self frame.

FIG. 5B is a signaling diagram illustrating a process of performing data communication, which is performed in a licensed band, by reserving a channel of an unlicensed band using a CTS-to-self frame according to an embodiment of the present disclosure. Operations 530, 532, 534 and 536 in FIG. 5B correspond to above-described operations 500, 502, 504 and 506 in FIG. 5A, so a detailed description thereof will be omitted.

Referring to FIG. 5B, if a channel of an unlicensed band is successfully occupied through the channel contention for an unlicensed band in operation 536, the second communication entity 556 may send a channel reservation response message to the common layer 552 in operation 538. The channel reservation response message may include channel information (channel number or frequency and bandwidth information of an unlicensed band) and information about the reserved period.

In operation 540, the second communication entity 556 may broadcast a CTS-to-self frame to prevent other communication terminals from using the channel of the unlicensed band. The CTS-to-self frame may include a Duration field including channel reservation period information. Upon receiving the CTS-to-self frame, the second communication terminals 560 and 570 may set a timer for preventing the use of the channel of the unlicensed band according to the channel reservation period information included in the CTS-to-self frame in operations 548 and 551, respectively.

Upon receiving the channel reservation response in operation 538, the common layer 552 may determine the communication scheme to be used for the common layer 552's communication with a UE in the channel of the unlicensed band, taking into account the wireless environment condition, traffic load and the like. If the common layer 552 determines use of the first communication scheme which is used in a licensed band, the common layer 552 may instruct the first communication entity 554 to transmit data in accordance with the first communication scheme in the channel of the unlicensed band, in operation 544.

In operation 553, the first communication entity 554 may perform data communication in accordance with the first communication scheme using the channel of the unlicensed band, until the reserved period of the unlicensed band expires. For example, if the LTE communication scheme is used in the licensed band, the first communication entity 554 may perform data transmission/reception in accordance with the LTE communication scheme using the resources for Wi-Fi communication which is communication of an unlicensed band.

If the timers expire in operations 555 and 557, the second communication terminals 560 and 570 may perform again the channel contention for a channel of an unlicensed band to perform data communication based on the second communication scheme.

Next, reference will be made to FIG. 5C to describe a method of performing data communication, which is performed in a licensed band, by reserving a channel of an unlicensed band using a preamble and a PLCP header of a PHY layer except for a payload of an unlicensed band frame.

FIG. 5C is a signaling diagram illustrating a process of performing data communication, which is performed in a licensed band, by reserving a channel of an unlicensed band using a preamble and a PLCP header of a PHY layer except for a payload of an unlicensed band frame according to an embodiment of the present disclosure. Operations 561, 563, 565 and 567 in FIG. 5C correspond to above-described operations 500, 502, 504 and 506 in FIG. 5A, so a detailed description thereof will be omitted.

Referring to FIG. 5C, if a channel of an unlicensed band is successfully occupied through the channel contention for an unlicensed band in operation 567, the second communication entity 556 may send a channel reservation response message to the common layer 552 in operation 569. The channel reservation response message may include channel information (channel number or frequency and bandwidth information of an unlicensed band) and information about the reserved period.

In operation 573, the second communication entity 556 may broadcast a preamble and a PLCP header of a PHY layer except for a payload of an unlicensed band frame to other communication terminals (e.g., the second communication terminals 560 and 570) that may use the channel of the unlicensed band. The preamble may include information for making it possible to detect the PLCP header, and the PLCP header may include a Rate field including information about a transfer rate of the BS 550, and a Length field indicating the time needed to transmit one MAC PDU.

Each of the second communication terminals 560 and 570 may determine duration for communication to be performed in an unlicensed band, based on the information included in the Rate field and the Length field. Accordingly, the second communication terminals 560 and 570 may set a timer based on the determined duration in operations 577 and 579, respectively. During the time based on the timer, the second communication terminals 560 and 570 may determine that the channel is busy, regardless of the carrier sense results by the CCA interface of the unlicensed band PHY layer.

Upon receiving the channel reservation response in operation 569, the common layer 552 may determine the communication scheme to be used for the common layer 552's communication with a UE in the channel of the unlicensed band, taking into account the wireless environment condition, traffic load and the like. If the common layer 552 determines use of the first communication scheme which is used in a licensed band, the common layer 552 may instruct the first communication entity 554 to transmit data in accordance with the first communication scheme in the channel of the unlicensed band, in operation 575.

In operation 581, the first communication entity 554 may perform data communication in accordance with the first communication scheme using the channel of the unlicensed band, until the reserved period of the unlicensed band expires. For example, if the LTE communication scheme is used in the licensed band, the first communication entity 554 may perform data transmission/reception in accordance with the LTE communication scheme using the resources for Wi-Fi communication which is communication of an unlicensed band.

If the timers expire in operations 583 and 585, the second communication terminals 560 and 570 may perform again the channel contention for a channel of an unlicensed band taking into account the carrier sense results by the CCA interface of the unlicensed band PHY layer, to perform data communication based on the second communication scheme.

Figure 6:
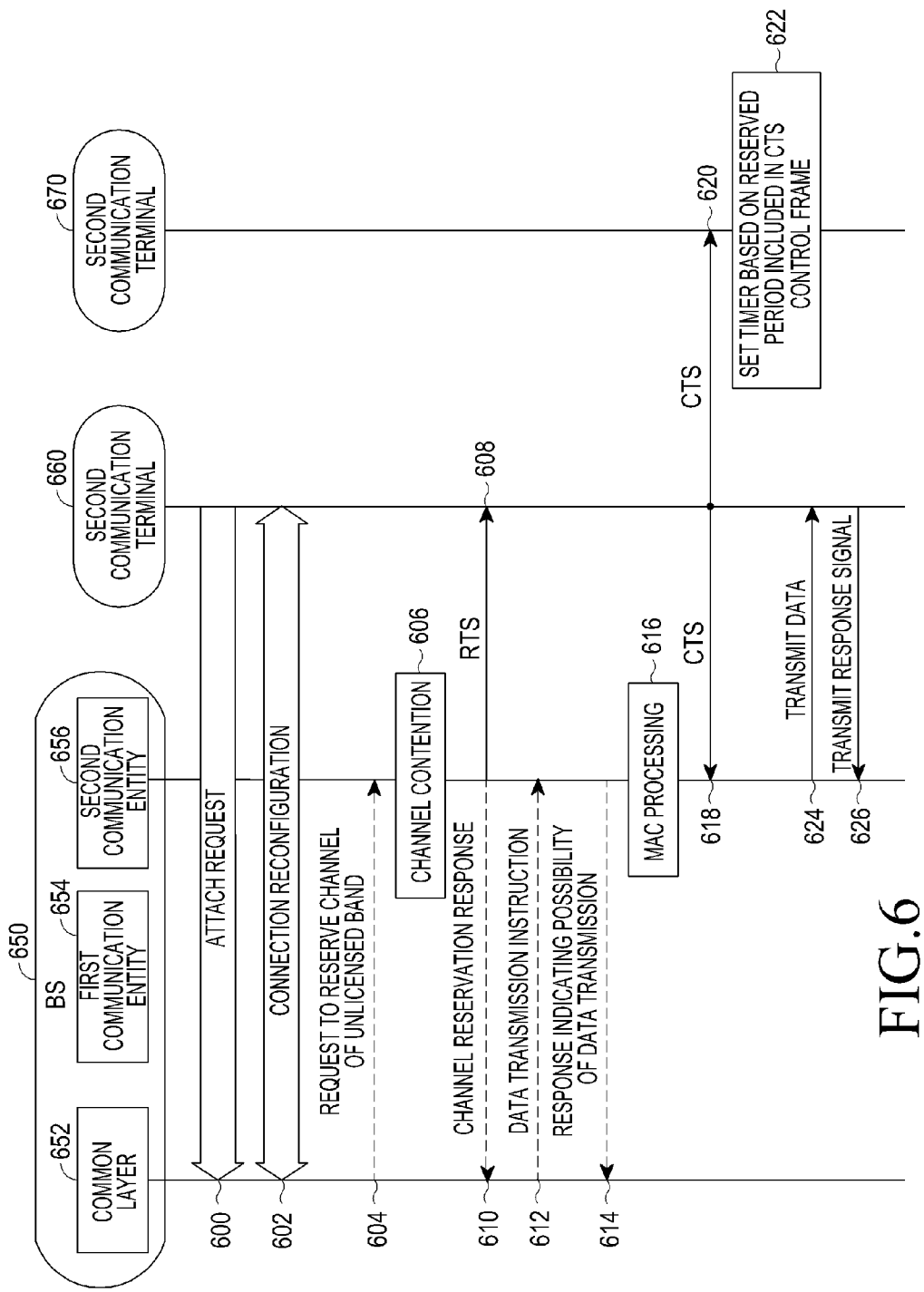
FIG. 6 is a signaling diagram illustrating a process of reserving a channel of an unlicensed band and using the reserved channel for data communication of an unlicensed band by a BS and a UE according to an embodiment of the present disclosure.

FIG. 6 is a signaling diagram illustrating a process of reserving a channel of an unlicensed band and using the reserved channel for data communication of an unlicensed band by a BS and a UE according to an embodiment of the present disclosure.

Referring to FIG. 6, a BS 650 may include a common layer 652, a first communication entity 654 that performs communication corresponding to a first communication scheme (e.g., an LTE communication scheme) in a licensed band or an unlicensed band, and a second communication entity 656 that performs communication corresponding to a second communication scheme (e.g., a Wi-Fi communication scheme) in an unlicensed band. A second communication terminal 660 performing communication with the BS 650 may include a communication interface for performing communication corresponding to the second communication scheme. The second communication terminal 660 may include a communication interface for communication corresponding to another communication scheme, which will be omitted in an embodiment of the present disclosure. Another second communication terminal 670 that uses the unlicensed band may exist around the BS 650 and the second communication terminal 660.

In this communication environment, in operation 600, the second communication terminal 660 may send to the BS 650 an Attach Request message including user preference information and band information (radio information) that the second communication terminal 660 uses for the second communication terminal 660's initial access to the BS 650.

In operation 602, the BS 650 may exchange a Connection Reconfiguration message with the second communication terminal 660 so that the second communication terminal 660 may perform communication based on a specific wireless interface. If the BS 650 and the second communication terminal 660 each include an interface for LTE communication, the Connection Reconfiguration message may be implemented by extending an LTE RRC Connection Reconfiguration message.

Upon receiving a packet, the common layer 652 of the BS 650 may request the second communication entity 656 to reserve a channel of an unlicensed band in operation 604. The common layer 652 may also provide, to the second communication entity 656, a channel number of an unlicensed band, which is desired to be reserved, and a reserved period indicating a period for which the channel of the unlicensed band is to be used.

In operation 606, the second communication entity 656 may perform channel contention for an unlicensed band. For example, if the unlicensed band is a Wi-Fi band, the second communication entity 656 may perform CSMA/CA channel contention that is based on the IEEE 802.11 standard.

If a channel of an unlicensed band is successfully occupied through the channel contention, the second communication entity 656 may transmit an RTS control frame to the second communication terminal 660 in operation 608. A Duration field of a MAC header of the RTS control frame may include information about a reserved period requested by the common layer 652.

During the time from operation 608 until operation 618 in which the second communication terminal 660 transmits a CTS control frame to the BS 650 in response to the RTS control frame, the BS 650 may perform the following operation.

If a channel of an unlicensed band is occupied, the second communication entity 656 of the BS 650 may send a channel reservation response message to the common layer 652 in operation 610. The channel reservation response message may include channel information (channel number or frequency and bandwidth information of an unlicensed band) and information about the reserved period.

The common layer 652 may determine the interface to be used for common layer 652's communication with a UE in the channel of the unlicensed band, taking into account the wireless environment condition, traffic load and the like. If the common layer 652 determines it is the second communication entity 656, the common layer 652 may instruct the second communication entity 656 to transmit data in accordance with the second communication scheme in the channel of the unlicensed band, in operation 612.

In operation 614, the second communication entity 656 may send, to the common layer 652, a response message indicating that the second communication entity 656 may transmit data in accordance with the second communication scheme using a channel of an unlicensed band. In operation 616, the second communication entity 656 may perform MAC processing including a MAC header insertion process. Upon receiving a CTS control frame from the second communication terminal 660 in response to the RTS control frame, the second communication entity 656 may transmit data to the second communication terminal 660 in accordance with the second communication scheme using the channel of the unlicensed band in operation 624, and receive a response signal for the transmitted data in operation 626. Operations 624 and 626 may be performed until the reserved period of the channel of the unlicensed band expires.

When transmitting a CTS control frame to the BS 650, the second communication terminal 660 may transmit the CTS control frame even to the nearby second communication terminal 670 as shown in operation 620. The CTS control frame, like the RTS control frame, may include information about the reserved period. Accordingly, in operation 622, the second communication terminal 670 may set a timer according to the reserved period information included in a Duration field of a MAC header of the CTS control frame. The second communication terminal 670 may drive a timer as a NAV timer, and may not participate in the channel contention for an unlicensed band during the period in which the timer is driven.

A description will now be made of a process of performing data communication using a channel of an unlicensed band and a channel of a licensed band by a BS and a UE according to an embodiment of the present disclosure. This process may be performed as illustrated in FIGS. 7A to 7C, according to the three channel reservation methods.

First, reference will be made to FIG. 7A to describe a method of performing data communication using a channel of a licensed band and a channel of an unlicensed band by reserving a channel of an unlicensed band using RTS and CTS control frames.

Figure 7A:
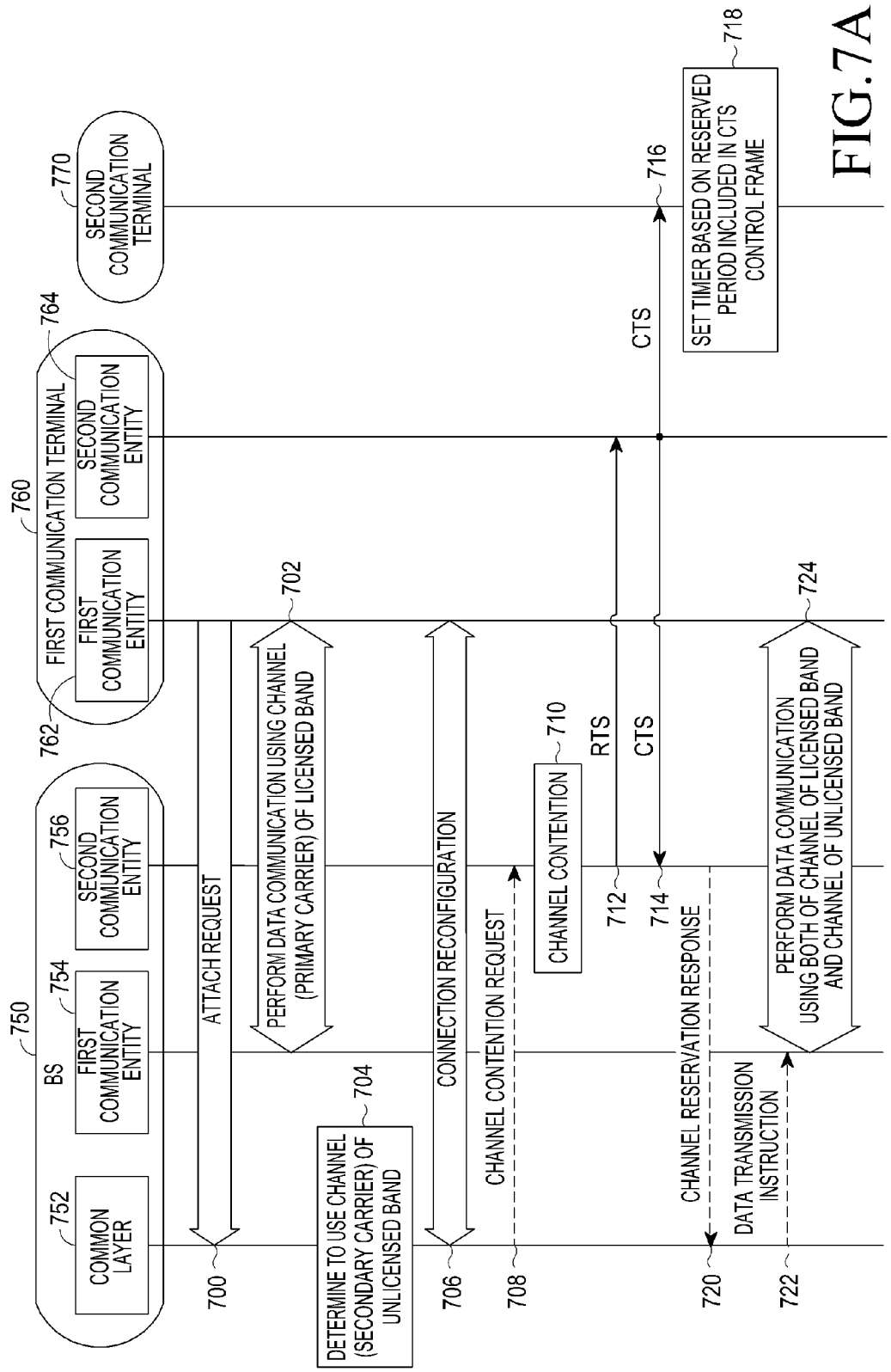
FIG. 7A is a signaling diagram illustrating a process of performing data communication using a channel of an unlicensed band and a channel of a licensed band by a BS and a UE through a channel reservation process that uses RTS and CTS control frames according to an embodiment of the present disclosure.
Figure 7B:
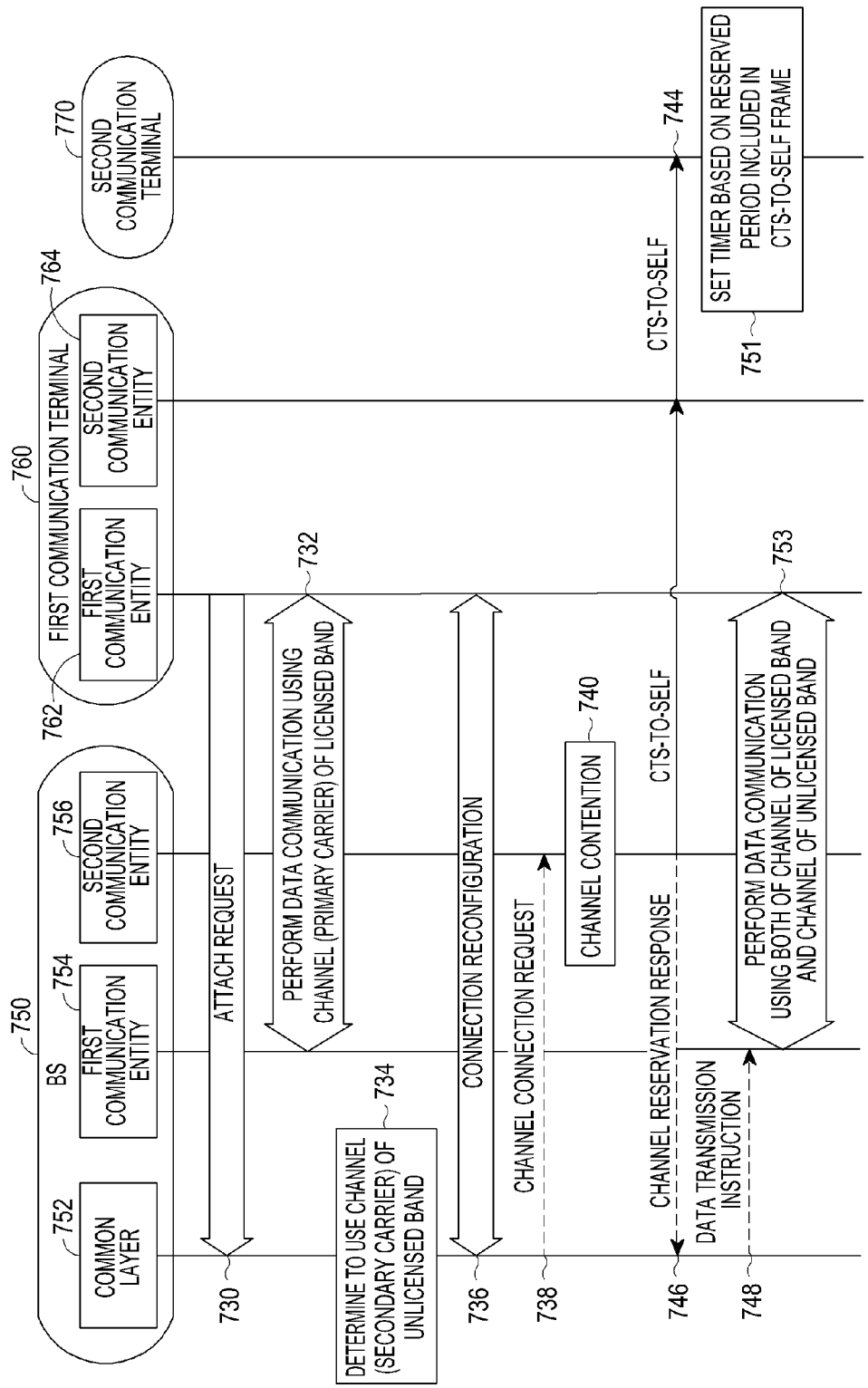
FIG. 7B is a signaling diagram illustrating a process of performing data communication using a channel of an unlicensed band and a channel of a licensed band by a BS and a UE through a channel reservation process that uses a CTS-to-self frame according to an embodiment of the present disclosure.
Figure 7C:
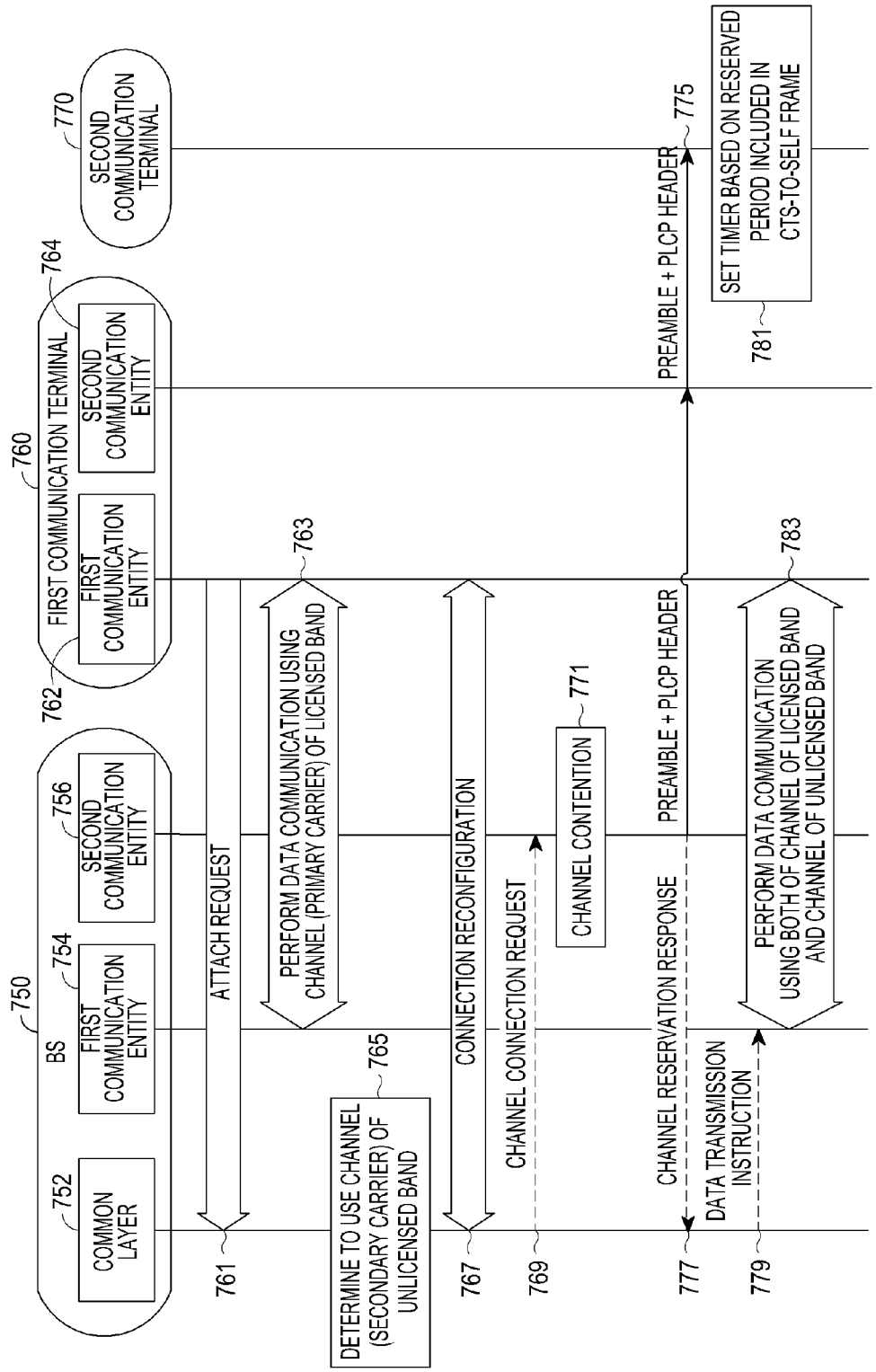
FIG. 7C is a signaling diagram illustrating a process of performing data communication using a preamble and a PLCP header of a PHY layer except for a payload of an unlicensed band frame according to an embodiment of the present disclosure.

FIG. 7A is a signaling diagram illustrating a process of performing data communication using a channel of an unlicensed band and a channel of a licensed band by a BS and a UE through a channel reservation process that uses RTS and CTS control frames according to an embodiment of the present disclosure.

Referring to FIG. 7A, a BS 750 may include a common layer 752, a first communication entity 754 that performs communication corresponding to a first communication scheme (e.g., an LTE communication scheme) in at least one of a licensed band and unlicensed band, and a second communication entity 756 that performs communication corresponding to a second communication scheme (e.g., a Wi-Fi communication scheme) in an unlicensed band. A first communication terminal 760 performing communication with the BS 750 may include a first communication entity 762 that performs communication corresponding to the first communication scheme in at least one of the licensed band and the unlicensed band, and a second communication entity 764 that performs communication corresponding to the second communication scheme in the unlicensed band. The BS 750 and the first communication terminal 760 may have a Carrier Aggregation (CA) function capable of performing communication using carriers of several bands. A second communication terminal 770 that performs communication corresponding to the second communication scheme using a channel of an unlicensed band may exist around the BS 750 and the first communication terminal 760.

In this communication environment, in operation 700, the first communication terminal 760 may send to the BS 750 an Attach Request message including user preference information and band information (radio information) that the first communication terminal 760 uses for the first communication terminal 760's initial access to the BS 750. In operation 702, the first communication terminal 760 may transmit and receive data to/from the BS 750 by using a channel of a licensed band as a primary carrier.

If the common layer 752 of the BS 750 determines to use a channel of an unlicensed band as a secondary carrier in operation 704, the BS 750 and the first communication terminal 760 may exchange a Connection Reconfiguration message with each other in operation 706 so that the first communication terminal 760 may prepare to use the channel of the unlicensed band. In the case of LTE communication, the Connection Reconfiguration message may be implemented by extending an RRC Connection Reconfiguration message.

Upon receiving the Connection Reconfiguration message, the first communication terminal 760 may perform a setting operation for using the channel of the unlicensed band as a secondary carrier, based on the information included in the Connection Reconfiguration message, and activate or enable the first communication terminal 760's second communication entity 764.

If the connection reconfiguration between the BS 750 and the first communication terminal 760 is completed, the common layer 752 of the BS 750 may request the second communication entity 756 to perform channel contention for reservation of a channel of an unlicensed band in operation 708. The common layer 752 may also provide, to the second communication entity 756, a channel number of an unlicensed band, which is desired to be reserved, and a reserved period indicating a period for which the channel of the unlicensed band is to be used.

In operation 710, the second communication entity 756 may perform channel contention for an unlicensed band. For example, if the unlicensed band is a Wi-Fi band, the second communication entity 756 may perform CSMA/CA channel contention that is based on the IEEE 802.11 standard.

If a channel of an unlicensed band is successfully occupied through the channel contention, the second communication entity 756 may transmit an RTS control frame to the first communication terminal 760 in operation 712. A Duration field of a MAC header of the RTS control frame may include information about a reserved period requested by the common layer 752.

Upon receiving the RTS control frame, the first communication terminal 760 may transmit a CTS control frame to the BS 750 in response to the RTS control frame in operation 714. The first communication terminal 760 may transmit the CTS control frame even to the nearby second communication terminal 770 as shown in operation 716.

The CTS control frame, like the RTS control frame, may include information about the reserved period. Accordingly, in operation 718, the second communication terminal 770 may set a timer according to the reserved period information included in a Duration field of a MAC header of the CTS control frame. The second communication terminal 770 may drive a timer as a NAV timer, and may not participate in the channel contention for an unlicensed band during the period in which the timer is driven.

If the CTS control frame is received, the second communication entity 756 of the BS 750 may determine that a channel of an unlicensed band has been successfully reserved. In operation 720, the second communication entity 756 may send a channel reservation response message to the common layer 752. The channel reservation response message may include channel information (channel number or frequency and bandwidth information of an unlicensed band) and information about the reserved period.

By using a channel of an unlicensed band as a secondary carrier, the common layer 752 may instruct the first communication entity 754 to transmit data using a channel of a licensed band and a channel of an unlicensed band in operation 722 so that communication corresponding to the first communication scheme may be performed. In operation 724, the first communication entity 754 may perform data communication in accordance with the first communication scheme using both of the channel (or primary carrier) of the licensed band and the channel (or secondary carrier) of the unlicensed carrier, until the reserved period of the channel of the unlicensed band expires.

For example, if the first communication scheme is the LTE communication scheme, data transmission/reception based on the LTE communication scheme may be performed, as the carrier of the LTE frequency band is used as a primary carrier and the carrier of the Wi-Fi frequency band which is the unlicensed band is used as a secondary carrier. The LTE data communication procedure that uses CA may follow the existing standard of LTE data communication, so a detailed description thereof will be omitted in an embodiment of the present disclosure.

Next, reference will be made to FIG. 7B to describe a method of performing data communication using a channel of a licensed band and a channel of an unlicensed band by reserving a channel of an unlicensed band using a CTS-to-self frame.

FIG. 7B is a signaling diagram illustrating a process of performing data communication using a channel of an unlicensed band and a channel of a licensed band by a BS and a UE through a channel reservation process that uses a CTS-to-self frame according to an embodiment of the present disclosure.

Operations 730, 732, 734, 736, 738 and 740 in FIG. 7B correspond to above-described operations 700, 702, 704, 706, 708 and 710 in FIG. 7A, so a detailed description thereof will be omitted.

Referring to FIG. 7B, if a channel of an unlicensed band is successfully occupied through the channel contention for the unlicensed band in operation 740, the second communication entity 756 may broadcast a CTS-to-self frame in operation 744. The CTS-to-self frame may include a Duration field including channel reservation period information, and may be broadcasted to communication terminals that may use the channel of the unlicensed band.

In operation 751, upon receiving the CTS-to-self frame, the second communication terminal 770 may set a timer according to the channel reservation period information included in the CTS-to-self frame. The second communication terminal 770 may drive the timer as a NAV timer, and may not participate in the channel contention for an unlicensed band during the period in which the timer is driven.

If the channel of the unlicensed band is successfully occupied, the second communication entity 756 may send a channel reservation response message to the common layer 752 in operation 746. The channel reservation response message may include channel information (channel number or frequency and bandwidth information of an unlicensed band) and information about the reserved period.

By using a channel of an unlicensed band as a secondary carrier, the common layer 752 may instruct the first communication entity 754 to transmit data using a channel of a licensed band and a channel of an unlicensed band in operation 748 so that communication corresponding to the first communication scheme may be performed. In operation 753, the first communication entity 754 may perform data communication in accordance with the first communication scheme using both of the channel (or primary carrier) of the licensed band and the channel (or secondary carrier) of the unlicensed carrier, until the reserved period of the channel of the unlicensed band expires. For example, if the first communication scheme is the LTE communication scheme, data transmission/reception based on the LTE communication scheme may be performed, as the carrier of the LTE frequency band is used as a primary carrier and the carrier of the Wi-Fi frequency band which is the unlicensed band is used as a secondary carrier.

Next, reference will be made to FIG. 7C to describe a method of performing data communication using a preamble and a PLCP header of a PHY layer except for a payload of an unlicensed band frame.

FIG. 7C is a signaling diagram illustrating a process of performing data communication using a preamble and a PLCP header of a PHY layer except for a payload of an unlicensed band frame according to an embodiment of the present disclosure.

Operations 761, 763, 765, 767, 669 and 771 in FIG. 7C correspond to above-described operations 700, 702, 704, 706, 708 and 710 in FIG. 7A, so a detailed description thereof will be omitted.

Referring to FIG. 7C, if a channel of an unlicensed band is successfully occupied through the channel contention for the unlicensed band, the second communication entity 756 may broadcast a preamble and a PLCP header of a PHY layer except for a payload of an unlicensed band frame, to the communication terminals (e.g., the first communication terminal 760 and the second communication terminal 770) that may use the channel of the unlicensed band, in operation 775. The preamble may include information for making it possible to detect the PLCP header, and the PLCP header may include a Rate field including information about a transfer rate of the BS 750, and a Length field indicating the time needed to transmit one MAC PDU.

The second communication terminal 770 may determine duration for communication to be performed in an unlicensed band, based on the information included in the Rate field and the Length field. Accordingly, the second communication terminal 770 may set a timer based on the determined duration in operation 781. During the time based on the timer, the second communication terminal 770 may determine that the channel is busy, regardless of the carrier sense results by the CCA interface of the unlicensed band PHY layer.

If the channel of the unlicensed band is successfully occupied, the second communication entity 756 may send a channel reservation response message to the common layer 752 in operation 777. The channel reservation response message may include channel information (channel number or frequency and bandwidth information of an unlicensed band) and information about the reserved period.

By using a channel of an unlicensed band as a secondary carrier, the common layer 752 may instruct the first communication entity 754 to transmit data using a channel of a licensed band and a channel of an unlicensed band in operation 779 so that communication corresponding to the first communication scheme may be performed. In operation 783, the first communication entity 754 may perform data communication in accordance with the first communication scheme using both of the channel (or primary carrier) of the licensed band and the channel (or secondary carrier) of the unlicensed carrier, until the reserved period of the channel of the unlicensed band expires. For example, if the first communication scheme is the LTE communication scheme, data transmission/reception based on the LTE communication scheme may be performed, as the carrier of the LTE frequency band is used as a primary carrier and the carrier of the Wi-Fi frequency band which is the unlicensed band is used as a secondary carrier.

Operations of a BS and a UE according to an embodiment of the present disclosure will be described in detail below with reference to FIGS. 8 to 13.

Operations of the BS 550 and the second communication terminals 560 and 570 in the various embodiments presented in FIGS. 5A to 5C will be described with reference to FIGS. 8 and 9, respectively.

Figure 8:
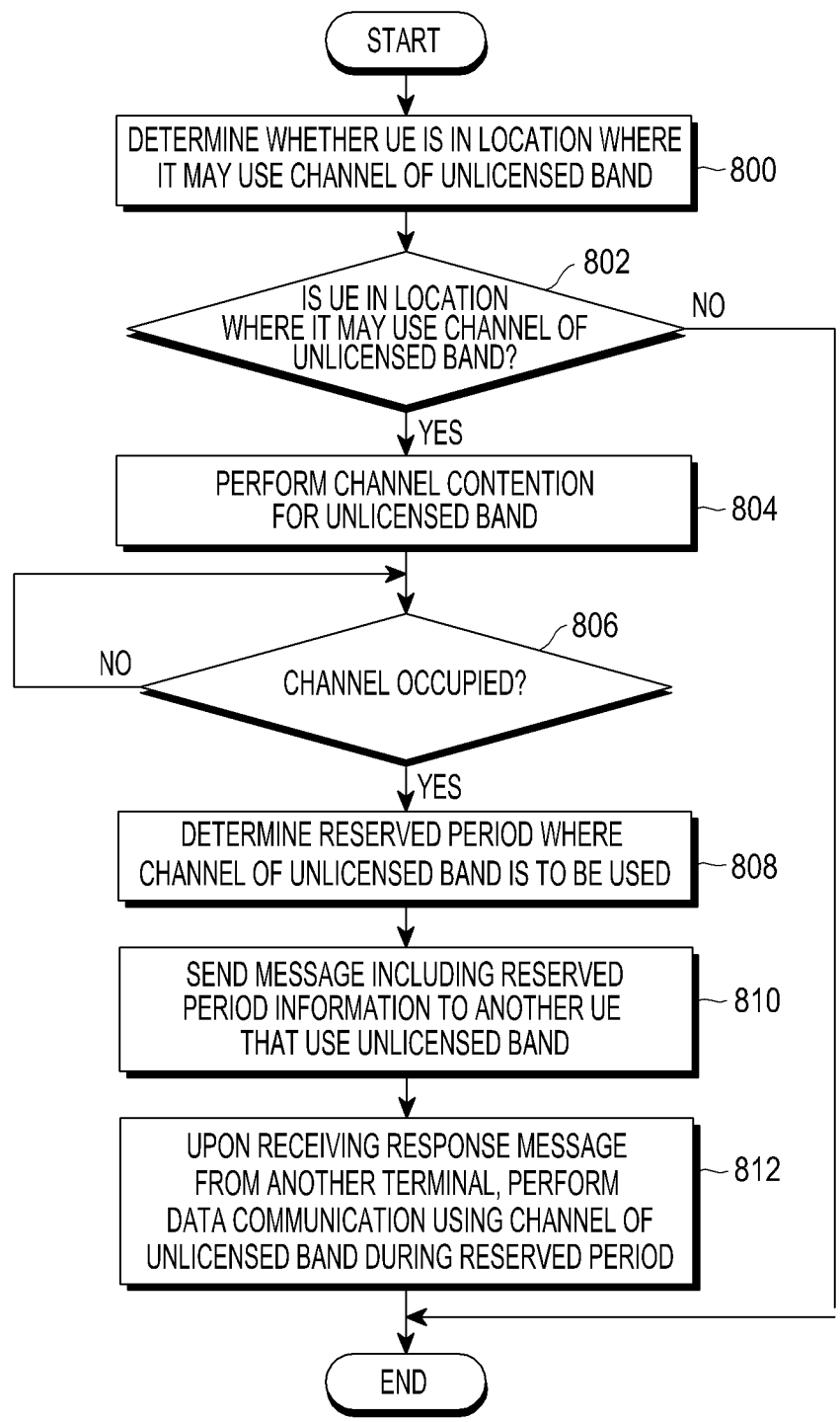
FIG. 8 is a flowchart illustrating a process of performing data communication, which is performed in a licensed band, using a channel of an unlicensed band by a BS according to an embodiment of the present disclosure.

FIG. 8 is a flowchart illustrating a process of performing data communication, which is performed in a licensed band, using a channel of an unlicensed band by a BS according to an embodiment of the present disclosure.

Referring to FIG. 8, the BS may determine in operation 800 whether a location of a UE performing data communication in accordance with the first communication scheme in a licensed band corresponds to a location where the UE may use a channel of an unlicensed band. In other words, the BS may determine whether the UE is in a location where the UE may use both of a channel of a licensed band and a channel of an unlicensed band.

If the UE is in the location where the UE may use the channel of the unlicensed band in operation 802, the BS may proceed to operation 804. Otherwise, the BS may end all the process. The BS may perform channel contention for the unlicensed band in operation 804, and determine in operation 806 whether the channel of the unlicensed band is occupied.

If the channel of the unlicensed band is occupied, the BS may determine a reserved period in which the BS will use the channel of the unlicensed band, to perform communication corresponding to the first communication scheme in operation 808. In operation 810, the BS may send a message (e.g., an RTS control frame including information about the reserved period) including the reserved period information to another UE that uses the unlicensed band.

In operation 812, upon receiving a response message (e.g., a CTS control frame) from another UE, the BS may perform data communication, which is performed in the licensed band, using the channel of the unlicensed band during the reserved period.

Figure 9:
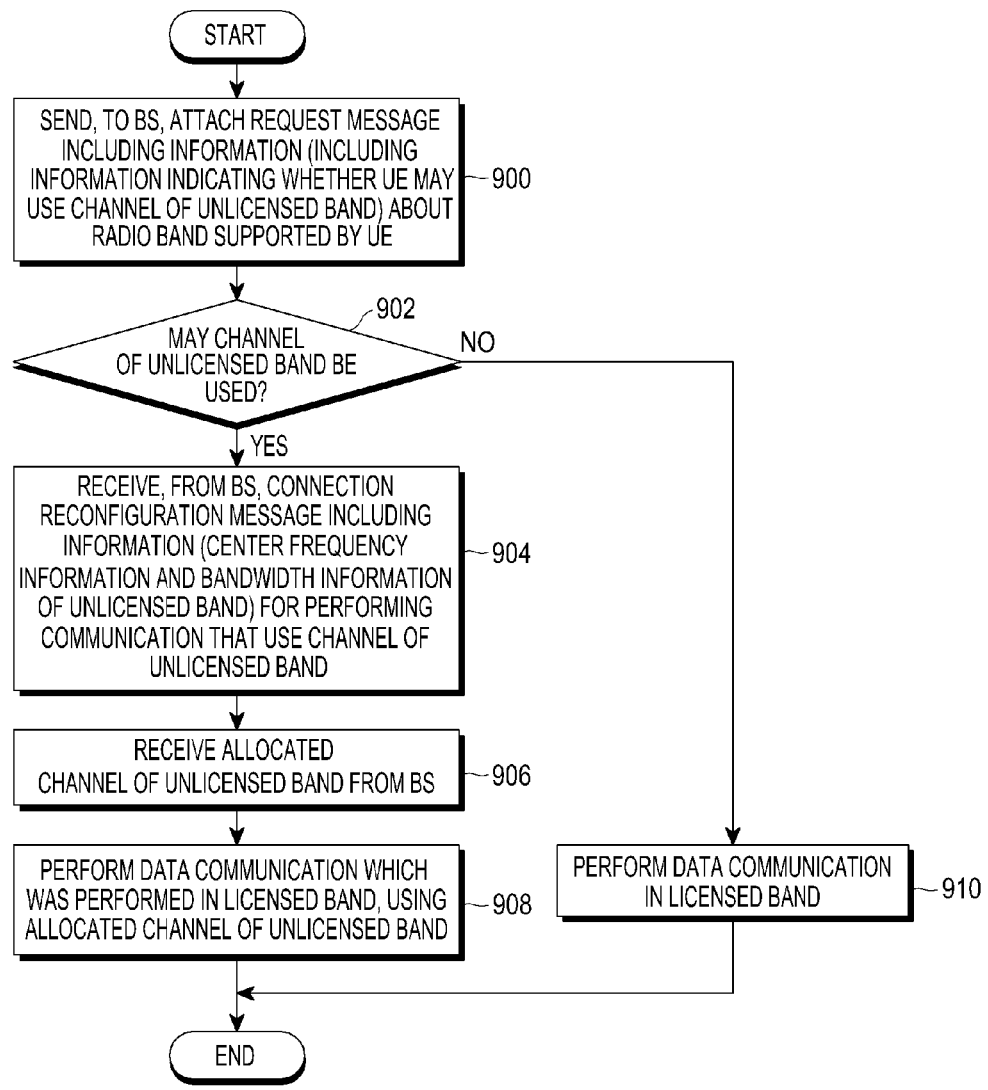
FIG. 9 is a flowchart illustrating a process of performing data communication, which is performed in a licensed band, using a channel of an unlicensed band by a UE according to an embodiment of the present disclosure.

FIG. 9 is a flowchart illustrating a process of performing data communication, which is performed in a licensed band, using a channel of an unlicensed band by a UE according to an embodiment of the present disclosure.

Referring to FIG. 9, in operation 900, the UE that performs communication corresponding to the first communication scheme may send, to a BS, an Attach Request message including information (including information indicating whether the UE may use a channel of an unlicensed band) about a radio band supported by the UE, for the UE's initial access to the BS.

If the UE may use the channel of the unlicensed band in operation 902, the UE may receive, from the BS, a Connection Reconfiguration message including information (e.g., center frequency information and bandwidth information of an unlicensed band) for performing communication corresponding to the first communication scheme using a channel of an unlicensed band, in operation 904.

The UE may be allocated a channel of an unlicensed band in operation 906, and perform data communication in accordance with the first communication scheme, which is performed in the licensed band, using the allocated channel of the unlicensed band in operation 908.

If the UE cannot use the channel of the unlicensed band in operation 902, the UE may continuously perform data communication in the licensed band in operation 910.

Next, operations of the BS 650 and the second communication terminal 660 in the embodiment presented in FIG. 6 will be described with reference to FIGS. 10 and 11, respectively.

Figure 10:
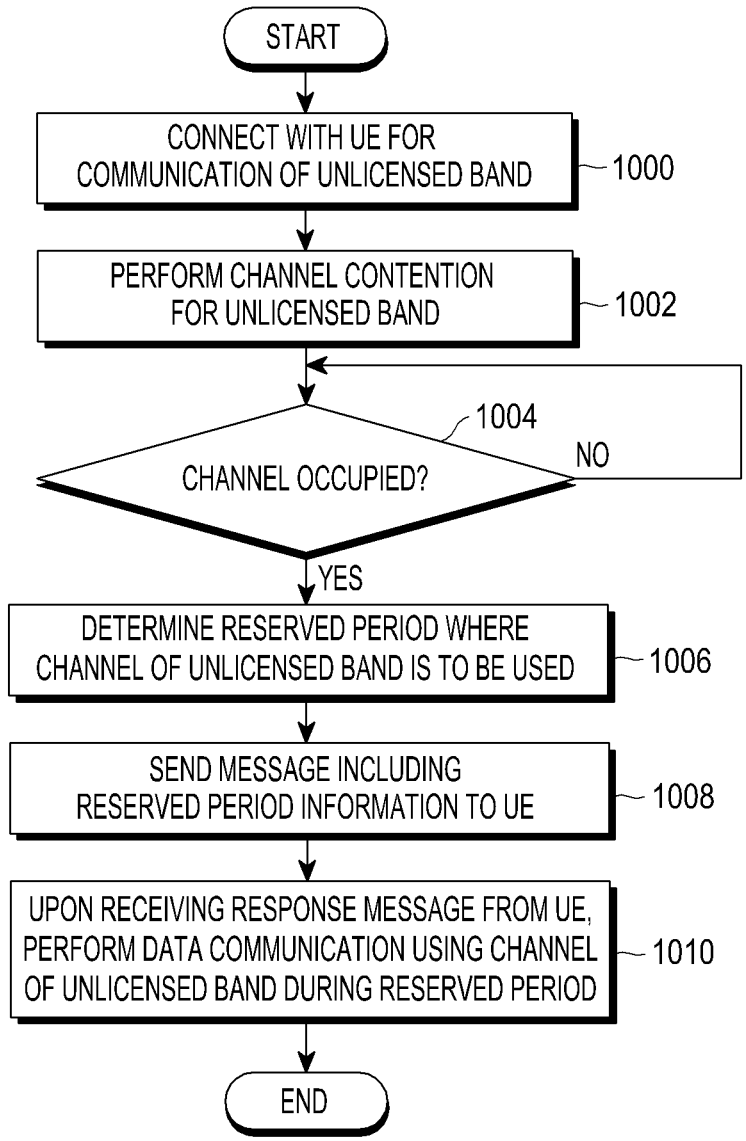
FIG. 10 is a flowchart illustrating a process of reserving a channel of an unlicensed band and using the reserved channel for data communication of an unlicensed band by a BS according to an embodiment of the present disclosure.

FIG. 10 is a flowchart illustrating a process of reserving a channel of an unlicensed band and using the reserved channel for data communication of an unlicensed band by a BS according to an embodiment of the present disclosure.

Referring to FIG. 10, if the BS is connected to a UE for communication corresponding to the second communication scheme in an unlicensed band in operation 1000, the BS may perform channel contention for the unlicensed band in operation 1002. In operation 1004, the BS may determine whether a channel of the unlicensed band is occupied. If the channel of the unlicensed band is occupied, the BS may determine a reserved period in which the BS will use the channel of the unlicensed band, in operation 1006.

In operation 1008, the BS may send a message (e.g., a RTS control frame) including information about the reserved period, to the UE. In operation 1010, upon receiving a response message to the sent message from the UE, the BS may perform data communication using the channel of the unlicensed band for the reserved period.

Figure 11:
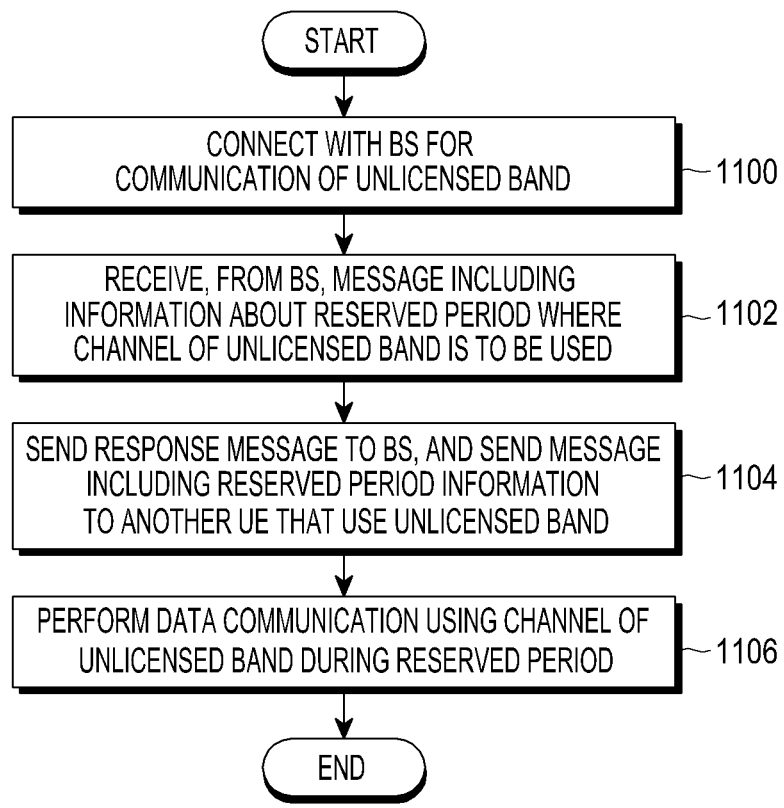
FIG. 11 is a flowchart illustrating a process of performing data communication by an unlicensed band UE according to an embodiment of the present disclosure.

FIG. 11 is a flowchart illustrating a process of performing data communication by an unlicensed band UE according to an embodiment of the present disclosure.

Referring to FIG. 11, if the UE is connected to a BS to perform communication corresponding to the second communication scheme in an unlicensed band in operation 1100, the UE may receive, from the BS, a message (e.g., an RTS control frame) including information about a reserved period in which the UE will use a channel of the unlicensed band, in operation 1102.

In operation 1104, the UE may send a response message to the received message to the BS, and send a message (or a CTS control frame) including information about the reserved period, to another UE that uses the unlicensed band. In operation 1106, the UE may perform data communication using the channel of the unlicensed band for the reserved period.

Next, operations of the BS 750 and the second communication terminal 660 in the embodiment presented in FIGS. 7A to 7C will be described with reference to FIGS. 12 and 13, respectively.

Figure 12:
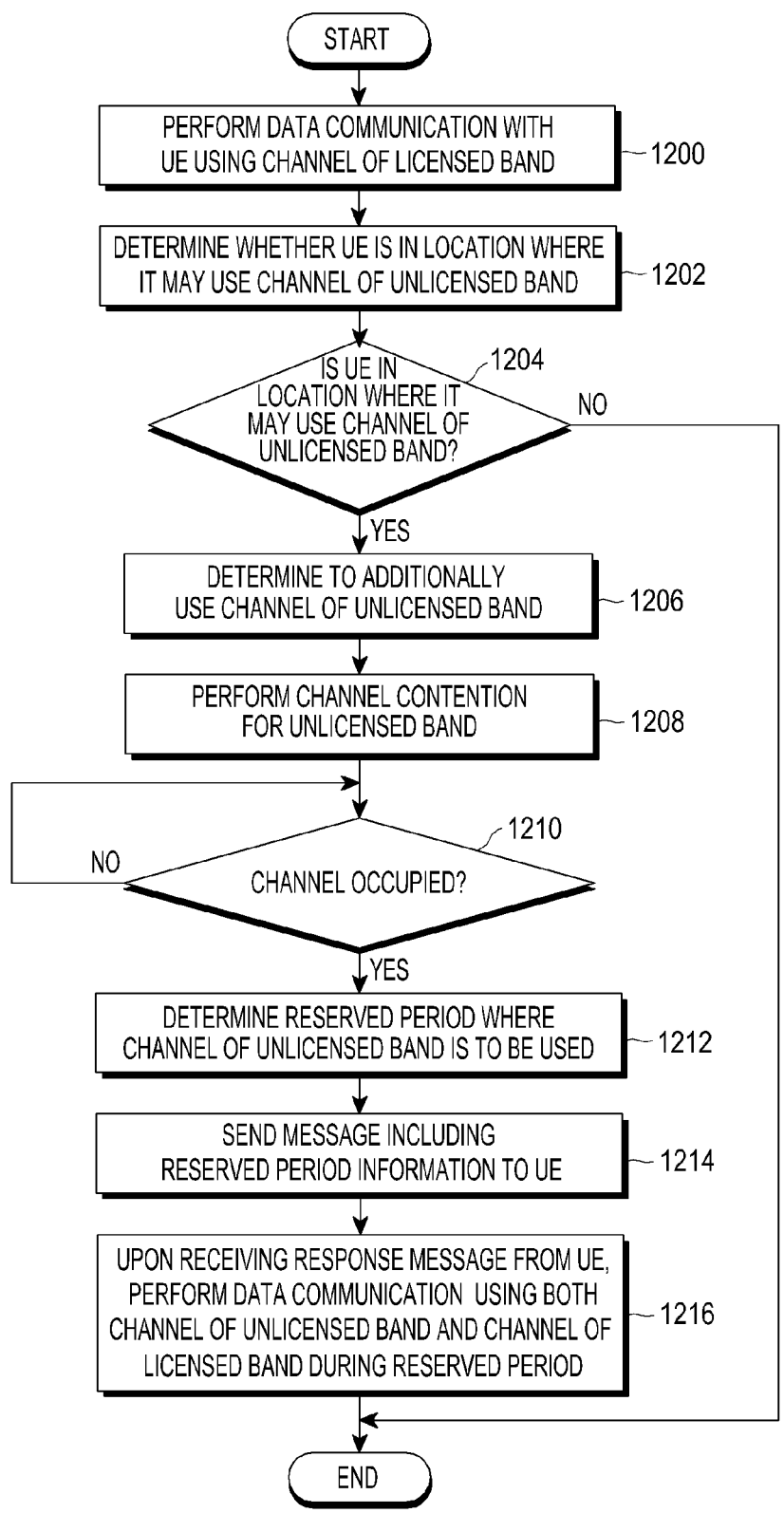
FIG. 12 is a flowchart illustrating a process of performing data communication using a channel of an unlicensed band and a channel of a licensed band by a BS according to an embodiment of the present disclosure.

FIG. 12 is a flowchart illustrating a process of performing data communication using a channel of an unlicensed band and a channel of a licensed band by a BS according to an embodiment of the present disclosure.

Referring to FIG. 12, the BS may perform data communication with a UE in accordance with the first communication scheme using a channel of a licensed band in operation 1200. In operation 1202, the BS may determine whether the location of the UE corresponds to a location where the UE may use a channel of an unlicensed band.

If it is determined in operation 1204 that the UE is in a location where the UE may use a channel of the unlicensed band, the BS may determine to additionally use a channel of the unlicensed band in operation 1206. In operation 1208, the BS may perform channel contention for the unlicensed band. As a result of the channel contention, the BS may determine in operation 1210 whether a channel of the unlicensed band is occupied.

If the channel of the unlicensed band is occupied, the BS may determine a reserved period in which the BS will use the channel of the unlicensed band, in operation 1212. In operation 1214, the BS may send a message (e.g., an RTS control frame) including information about the reserved period, to the UE. In operation 1216, upon receiving a response message to the sent message from the UE, the BS may perform data communication in accordance with the first communication scheme using both of the channel of the unlicensed band and the channel of the licensed band for the reserved period. The channel of the licensed band may be used as a primary carrier, and the channel of the unlicensed band may be used as a secondary carrier. If the reserved period expires, the data communication may be continuously performed through the channel of the licensed band.

Figure 13:
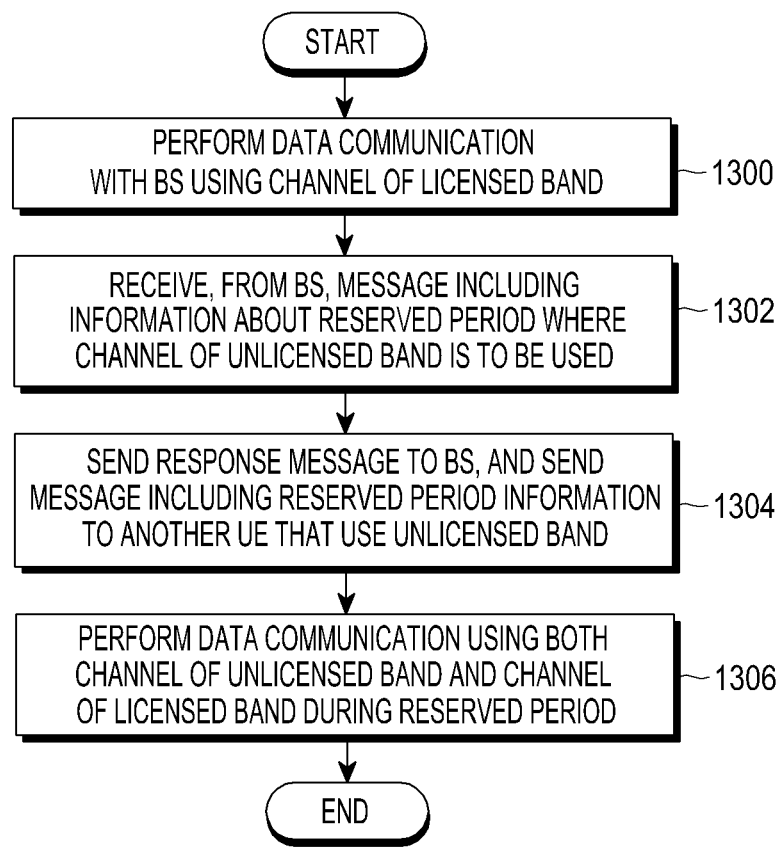
FIG. 13 is a flowchart illustrating a process of performing data communication using a channel of an unlicensed band and a channel of a licensed band by a UE according to an embodiment of the present disclosure.

FIG. 13 is a flowchart illustrating a process of performing data communication using a channel of an unlicensed band and a channel of a licensed band by a UE according to an embodiment of the present disclosure.

Referring to FIG. 13, the UE may perform data communication with a BS in accordance with the first communication scheme using a channel of a licensed band in operation 1300. Upon receiving a message (e.g., an RTS control frame) including information about a reserved period in which a channel of an unlicensed band is to be used, from the BS in operation 1302, the UE may send a response message (e.g., a CTS control frame) to the received message, to the BS in operation 1304. Subsequently, the UE may send a message (e.g., a CTS control frame) including information about the reserved band to another UE that uses the unlicensed band.

In operation 1306, the UE may perform data communication in accordance with the first communication scheme using both of the channel (or secondary carrier) of the unlicensed band and the channel (or primary carrier) of the licensed channel for the reserved period. If the reserved period expires, the UE may perform data communication in accordance with the first communication scheme using the channel of the licensed band.

Next, a description will be made of internal structures of a BS and a UE according to an embodiment of the present disclosure.

Figure 14:
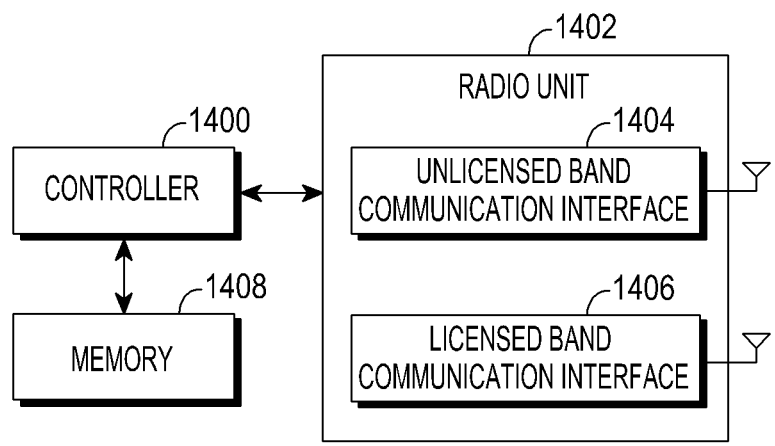
FIG. 14 is a block diagram of a BS according to an embodiment of the present disclosure.

FIG. 14 is a block diagram of a BS according to an embodiment of the present disclosure.

The BS may include a controller 1400, a radio unit 1402 and a memory 1408. The controller 1400 may control the radio unit 1402 and the memory 1408, and may also control the overall operation of the BS. In an embodiment of the present disclosure, the controller 1400 may perform the above-described BS's operation illustrated in FIGS. 5A to 7C.

The radio unit 1402 may include an unlicensed band communication interface 1404 and a licensed band communication interface 1406 as components for performing wireless communication with a UE. The unlicensed band communication interface 1404 may include a communication entity for performing communication that uses, for example, Wi-Fi technology, as a component for performing communication in the unlicensed band. The licensed band communication interface 1406 may include a communication entity for performing communication that uses, for example, LTE technology, as a component for performing communication in the licensed band. Although only one licensed band communication interface 1406 is illustrated in FIG. 14, the number of licensed band communication interfaces may be subject to change depending on the licensed band communication technology available in the BS.

The memory 1408 may store a variety of information corresponding to the operation of the BS, and may also store a variety of data corresponding to the communication with the UE.

Figure 15:
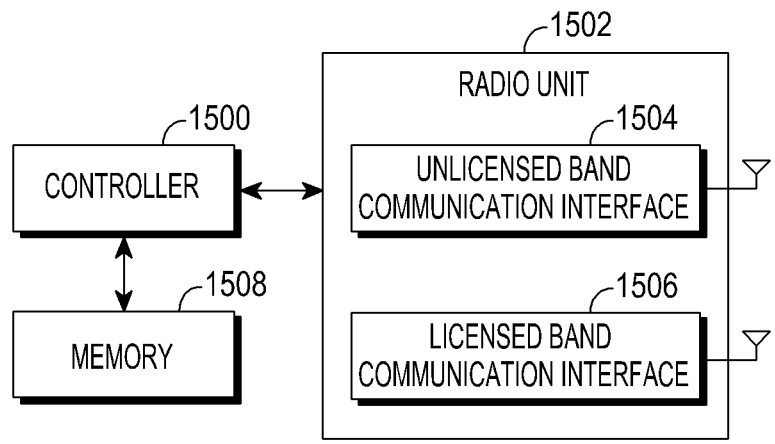
FIG. 15 is a block diagram of a UE according to an embodiment of the present disclosure.

FIG. 15 is a block diagram of a UE according to an embodiment of the present disclosure.

The UE may include a controller 1500, a radio unit 1502, and a memory 1508. The controller 1500 may control the radio unit 1502 and the memory 1508, and may also control the overall operation of the UE. In an embodiment of the present disclosure, the controller 1500 may perform the above-described operations of the first or second communication terminal illustrated in FIGS. 5A to 7C.

The radio unit 1502 may include an unlicensed band communication interface 1504 and a licensed band communication interface 1506 as components for performing wireless communication with a BS. The unlicensed band communication interface 1504 may include a communication entity for performing communication that uses, for example, Wi-Fi technology, as a component for performing communication in the unlicensed band. The licensed band communication interface 1506 may include a communication entity for performing communication that uses, for example, LTE technology, as a component for performing communication in the licensed band. Although only one licensed band communication interface 1506 is illustrated in FIG. 15, the number of licensed band communication interfaces may be subject to change depending on the licensed band communication technology available in the UE.

The memory 1508 may store a variety of information corresponding to the operation of the UE, and may also store a variety of data corresponding to the communication with the BS.

As is apparent from the foregoing description, the present disclosure may make it possible to use specific communication technology such as cellular communication even in an unlicensed band by reserving a channel of the unlicensed band, thereby increasing the data throughput of the specific communication technology without paying for the frequency usage. In addition, in using the specific communication technology in the unlicensed band, the present disclosure may guarantee the safety of the WLAN system that is designed to use the existing unlicensed band.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing communication by a cellular base station in a wireless communication system, the method comprising:
    performing channel contention for occupying a channel of an unlicensed band;
    if the channel of the unlicensed band is occupied, transmitting a first message including information about a time period in which the channel of the unlicensed band is useable, to at least one first User Equipment (UE) that performs communication in the channel of the unlicensed band using a first communication scheme; and
    performing communication with a second UE using a second communication scheme different from the first communication scheme in the channel of the unlicensed band during a time period corresponding to the time period information;
    wherein the second communication scheme corresponds to a cellular communication scheme, and the first message is transmitted to the at least one first UE based on the first communication scheme.

2. The method of claim 1, wherein the performing of channel contention comprises:
    receiving, from the second UE, a second message including information indicating whether the channel of the unlicensed band is usable by the second UE; and
    performing channel contention for occupying the channel of the unlicensed band, if it is determined based on the information included in the second message that the channel of the unlicensed band is usable by the second UE.

3. The method of claim 1, wherein the performing of communication with the second UE comprises performing communication with the second UE based on the second communication scheme by using a channel of a cellular band as a primary channel and the channel of the unlicensed band as a secondary channel, during the time period corresponding to the time period information.

4. The method of claim 1, wherein if the cellular base station includes a first communication entity for performing communication using the first communication scheme, a second communication entity for performing communication using the second communication scheme, and a common layer for managing the first communication entity and the second communication entity, the performing of channel contention comprises:
    if a request message for requesting to reserve the channel of the unlicensed band is received from the common layer, performing channel contention for occupying the channel of the unlicensed band by the first communication entity.

5. The method of claim 4, wherein the performing of communication with the second UE comprises:
- if a response message to the request message is forwarded from the first communication entity to the common layer, performing communication with the second UE using the second communication scheme in the channel of the unlicensed band during the time period corresponding to the time period information by the second communication entity under instruction of the common layer;
- wherein the response message includes at least one of a channel number of the unlicensed band, frequency information for the channel of the unlicensed band, and bandwidth information for the channel of the unlicensed band.

6. The method of claim 1, wherein the performing of communication with the second UE comprises:
- if the first message corresponds to a Request To Send (RTS) control frame, determining whether a Clear To Send (CTS) control frame is received in response to the RTS control frame; and
- if the CTS control frame is received, performing communication with the second UE using the second communication scheme in the channel of the unlicensed band during the time period corresponding to the time period information.

7. The method of claim 1, wherein the first message corresponds to one of a CTS control frame in which an address of the cellular base station is set as a destination address, and a Physical Layer Convergence Protocol (PLCP) header that includes a rate field including information about a transfer rate of the cellular base station and a length field including information about a data transmission time.

8. A method for performing communication by a User Equipment (UE) in a wireless communication system, the method comprising:
- transmitting a first message including information indicating whether a channel of an unlicensed band is usable by the UE, to a cellular base station in a channel of a cellular band using a first communication scheme;
- if the channel of the unlicensed band is usable by the UE, receiving an allocated channel of the unlicensed band from the cellular base station; and
- performing communication with the cellular base station in the allocated channel of the unlicensed band using the first communication scheme;
- wherein the first communication scheme includes a cellular communication scheme, and is different from a second communication scheme that is used in the channel of the unlicensed band.

9. The method of claim 8, wherein the performing of communication with the cellular base station comprises performing communication with the cellular base station by using the channel of the cellular band as a primary channel and the channel of the unlicensed band as a secondary channel, for a time period.

10. The method of claim 9, wherein information about the time period is transmitted to at least one second UE that uses the channel of the unlicensed band, by the cellular base station, and communication for the at least one second UE is interrupted for the time period.

11. A cellular base station in a wireless communication system, the cellular base station comprising:
- a first communication entity configured to perform communication using a first communication scheme;
- a second communication entity configured to perform communication using a second communication scheme; and
- a controller configured to control the first communication entity to perform channel contention for occupying a channel of an unlicensed band, and if the channel of the unlicensed band is occupied, transmit a first message including information about a time period in which the channel of the unlicensed band is usable, to at least one first User Equipment (UE) that performs communication in the channel of the unlicensed band using the first communication scheme, and to control the second communication entity to perform communication with a second UE using a second communication scheme different from the first communication scheme in the channel of the unlicensed band during a time period corresponding to the time period information;
- wherein the second communication scheme corresponds to a cellular communication scheme, and the first message is transmitted to the at least one first UE based on the first communication scheme.

12. The cellular base station of claim 11, wherein upon receiving, from the second UE, a second message including information indicating whether the channel of the unlicensed band is usable by the second UE, the controller performs channel contention for occupying the channel of the unlicensed band, if it is determined based on the information included in the second message that the channel of the unlicensed band is usable by the UE.

13. The cellular base station of claim 11, wherein the controller controls the second communication entity to perform communication with the second UE based on the second communication scheme by using a channel of a cellular band as a primary channel and the channel of the unlicensed band as a secondary channel, during the time period corresponding to the time period information.

14. The cellular base station of claim 11, further comprising:
- a common layer configured to manage the first communication entity and the second communication entity; and
- wherein if a request message for requesting to reserve the channel of the unlicensed band is received from the common layer, the first communication entity performs channel contention for occupying the channel of the unlicensed band.

15. The cellular base station of claim 14, wherein if a response message to the request message is forwarded from the first communication entity to the common layer, the second communication entity performs communication with the second UE using the second communication scheme in the channel of the unlicensed band during the time period corresponding to the time period information under instruction of the common layer;
- wherein the response message includes at least one of a channel number of the unlicensed band, frequency information for the channel of the unlicensed band, and bandwidth information for the channel of the unlicensed band.

16. The cellular base station of claim 11, wherein if the first message corresponds to a Request To Send (RTS) control frame, the controller determines whether a Clear To Send (CTS) control frame is received in response to the RTS control frame, and if the CTS control frame is received, the controller performs communication with the second UE using the second communication scheme in the channel of the unlicensed band during the time period corresponding to the time period information.

17. The cellular base station of claim 11, wherein the first message corresponds to one of a CTS control frame in which an address of the cellular base station is set as a destination address, and a Physical Layer Convergence Protocol (PLCP) header that includes a rate field including information about a transfer rate of the cellular base station and a length field including information about a data transmission time.

18. A User Equipment (UE) in a wireless communication system, the UE comprising:
   a first entity configured to transmit a first message including information indicating whether a channel of an unlicensed band is usable by the UE, to a cellular base station in a channel of a cellular band using a first communication scheme; and
   a controller configured to, if the channel of the unlicensed band is usable by the UE, receive an allocated channel of the unlicensed band from the cellular base station, and perform communication with the cellular base station in the allocated channel of the unlicensed band using the first communication scheme;
   wherein the first communication scheme includes a cellular communication scheme, and is different from a second communication scheme that is used in the channel of the unlicensed band.

19. The UE of claim 18, wherein the controller performs communication with the cellular base station by using the channel of the cellular band as a primary channel and the channel of the unlicensed band as a secondary channel, for a time period.

20. The UE of claim 19, wherein information about the time period is transmitted to at least one second UE that uses the channel of the unlicensed band, by the cellular base station, and communication for the at least one second UE is interrupted for the time period.

* * * * *